United States Patent
Shinnae

(10) Patent No.: US 12,003,688 B2
(45) Date of Patent: Jun. 4, 2024

(54) SYSTEM, INFORMATION PROCESSING APPARATUS, AND CONTROL METHOD THEREOF COMPRISING VERIFYING COLOR BY USING A COLORIMETRIC VALUE ACQUIRED BY COLORIMETRY OF A SHEET BY AN IMAGE FORMING APPARATUS, AND DETERMINING AN ADJUSTMENT FUNCTION TO BE EXECUTED BASE ON THE COLOR VERIFICATION RESULT

(71) Applicant: CANON KABUSHIKI KAISHA, Tokyo (JP)

(72) Inventor: Toru Shinnae, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 18/179,079

(22) Filed: Mar. 6, 2023

(65) Prior Publication Data
US 2023/0300279 A1 Sep. 21, 2023

(30) Foreign Application Priority Data
Mar. 17, 2022 (JP) ................. 2022-042911

(51) Int. Cl.
*H04N 1/60* (2006.01)
*G01J 3/46* (2006.01)
*H04N 1/00* (2006.01)

(52) U.S. Cl.
CPC .............. *H04N 1/6033* (2013.01); *G01J 3/46* (2013.01); *H04N 1/00023* (2013.01)

(58) Field of Classification Search
CPC .......... H04N 1/00015; H04N 1/00023; H04N 1/00045; H04N 1/00058; H04N 1/6027; H04N 1/6033; H04N 2201/0093; G01J 3/46
USPC ........................................... 358/518
See application file for complete search history.

(56) References Cited

U.S. PATENT DOCUMENTS

| | | | |
|---|---|---|---|
| 2014/0226192 A1* | 8/2014 | Takemura | G01N 21/27 358/504 |
| 2016/0156810 A1* | 6/2016 | Nakamura | H04N 1/00015 358/1.9 |
| 2017/0097593 A1* | 4/2017 | Itagaki | G03G 15/1675 |
| 2020/0193247 A1* | 6/2020 | Song | G06K 15/129 |

FOREIGN PATENT DOCUMENTS

| | | | |
|---|---|---|---|
| JP | 2005268832 A | | 9/2005 |
| JP | 2013167819 A | | 8/2013 |
| JP | 2015019193 A | | 1/2015 |
| JP | 2016129990 A | * | 7/2016 |

(Continued)

*Primary Examiner* — Chad Dickerson
(74) *Attorney, Agent, or Firm* — Canon U.S.A., Inc. IP Division

(57) ABSTRACT

A system includes at least one processor configured to function as a color verification unit configured to execute color verification by using a colorimetric value acquired by colorimetry of a sheet output by an image forming apparatus, and a determination unit configured to determine an adjustment function to be executed by the image forming apparatus or an image processing apparatus connected to the image forming apparatus from among a plurality of adjustment functions, based on a result of the color verification.

17 Claims, 17 Drawing Sheets

(56) References Cited

FOREIGN PATENT DOCUMENTS

| | | | |
|---|---|---|---|
| JP | 2017201385 | A | 11/2017 |
| JP | 6299708 | B2 | 3/2018 |
| JP | 2018205461 | A | 12/2018 |

* cited by examiner

FIG.3A

| REFERENCE ID | REFERENCE NAME | PRINTER | ALLOWABLE VALUE |
|---|---|---|---|
| 0001 | JapanColor2011 | PRINTER A | AVERAGE COLOR DIFFERENCE: 2<br>MAXIMUM COLOR DIFFERENCE: 4 |
| 0002 | GRACoL2013 | PRINTER B | AVERAGE COLOR DIFFERENCE: 1<br>MAXIMUM COLOR DIFFERENCE: 5 |
| 0003 | FOGRA39 | PRINTER A | AVERAGE COLOR DIFFERENCE: 2<br>MAXIMUM COLOR DIFFERENCE: 6 |
| 0004 | FOGRA29 | PRINTER B | AVERAGE COLOR DIFFERENCE: 5<br>MAXIMUM COLOR DIFFERENCE: 5 |
| 0005 | COMPANY'S OWN REFERENCE | PRINTER A | AVERAGE COLOR DIFFERENCE: 3<br>MAXIMUM COLOR DIFFERENCE: 8 |

FIG.3B

| REFERENCE ID | PATCH ID | C | M | Y | K | REFERENCE VALUE L* | REFERENCE VALUE a* | REFERENCE VALUE b* |
|---|---|---|---|---|---|---|---|---|
| 0005 | 1 | 100 | 0 | 0 | 0 | 91.111 | -48.111 | -14.111 |
| | 2 | 0 | 100 | 0 | 0 | 60.222 | 98.222 | -60.222 |
| | 3 | 0 | 0 | 100 | 0 | 97.333 | -21.333 | 94.333 |
| | 4 | 0 | 0 | 0 | 100 | 0.444 | 0.444 | 0.444 |
| | 5 | 100 | 100 | 0 | 0 | 32.555 | 79.555 | -107.555 |
| | 6 | 100 | 0 | 100 | 0 | 87.666 | -86.666 | 83.666 |
| | 7 | 0 | 100 | 100 | 0 | 53.777 | 80.777 | 67.777 |
| | 8 | 80 | 0 | 0 | 0 | 90.888 | -45.888 | -13.888 |
| | ... | ... | ... | ... | ... | ... | ... | ... |

FIG.3C

| DETAILED NG ITEM | ADJUSTMENT FUNCTION |
|---|---|
| CMYK MONOCHROME 100% | MONOCHROME CALIBRATION |
| GRADATION OF CMYK (0 – 100%) | MONOCHROME CALIBRATION<br>DFE CALIBRATION |
| RGB (SECONDARY COLOR) 100% | COLOR-TRANSFER ADJUSTMENT |

FIG.4

PLEASE SELECT COLOR REFERENCE ~0402

REFERENCE ID [0005]  (CONFIRM)
         0403      0404

| REFERENCE ID | REFERENCE NAME |
|---|---|
| 0001 | JapanColor2011 |
| 0002 | GRACoL2013 |
| 0003 | FOGRA39 |
| 0004 | FOGRA29 |
| 0005 | COMPANY'S OWN REFERENCE |

0405

0406 START COLORIMETRY

REFERENCE NAME: COMPANY'S OWN REFERENCE ~0602

| PATCH ID | REFERENCE VALUE L* | REFERENCE VALUE a* | REFERENCE VALUE b* | COLORIMETRIC DATA L* | COLORIMETRIC DATA a* | COLORIMETRIC DATA b* | dE (COLOR DIFFERENCE) |
|---|---|---|---|---|---|---|---|
| 1 | 91.111 | -48.111 | -14.111 | x1 | y1 | z1 | 1 |
| 2 | 60.222 | 98.222 | -60.222 | x2 | y2 | z2 | 0.8 |
| 3 | 97.333 | -21.333 | 94.333 | x3 | y3 | z3 | 4 |
| 4 | 0.444 | 0.444 | 0.444 | x4 | y4 | z4 | 4 |
| 5 | 32.555 | 79.555 | -107.555 | x5 | y5 | z5 | 5 |
| 6 | 87.666 | -86.666 | 83.666 | x6 | y6 | z6 | 2 |
| 7 | 53.777 | 80.777 | 67.777 | x7 | y7 | z7 | 2.6 |
| 8 | 90.888 | -45.888 | -13.888 | x8 | y8 | z8 | 6.8 |
| ... | ... | ... | ... | ... | ... | ... | ... |

COMPREHENSIVE VERIFICATION RESULT ~0604

| | ALLOWABLE VALUE | MEASUREMENT RESULT |
|---|---|---|
| AVERAGE COLOR DIFFERENCE | 3 | 4 NG |
| MAXIMUM COLOR DIFFERENCE | 8 | 9 NG |

CLOSE ~0605

THE FOLLOWING ADJUSTMENT FUNCTIONS ARE EXECUTED BECAUSE VERIFICATION RESULTS ARE "NG". ~0607
- MONOCHROME CALIBRATION ~0608
- DFE CALIBRATION
- COLOR-TRANSFER ADJUSTMENT

CANCEL ~0609    EXECUTE ~0610

FIG.7

| RESULT ID | PATCH ID | C | M | Y | K | REFERENCE VALUE L* | REFERENCE VALUE a* | REFERENCE VALUE b* | COLORIMETRIC DATA L* | COLORIMETRIC DATA a* | COLORIMETRIC DATA b* | dE (COLOR DIFFERENCE) |
|---|---|---|---|---|---|---|---|---|---|---|---|---|
| 0001 | 1 | 100 | 0 | 0 | 0 | 91.111 | -48.111 | -14.111 | x1 | y1 | z1 | 1 |
| | 2 | 0 | 100 | 0 | 0 | 60.222 | 98.222 | -60.222 | x2 | y2 | z2 | 0.8 |
| | 3 | 0 | 0 | 100 | 0 | 97.333 | -21.333 | 94.333 | x3 | y3 | z3 | 4 |
| | 4 | 0 | 0 | 0 | 100 | 0.444 | 0.444 | 0.444 | x4 | y4 | z4 | 4 |
| | 5 | 100 | 100 | 0 | 0 | 32.555 | 79.555 | -107.555 | x5 | y5 | z5 | 5 |
| | 6 | 100 | 0 | 100 | 0 | 87.666 | -86.666 | 83.666 | x6 | y6 | z6 | 2 |
| | 7 | 0 | 100 | 100 | 0 | 53.777 | 80.777 | 67.777 | x7 | y7 | z7 | 2.6 |
| | 8 | 80 | 0 | 0 | 0 | 90.888 | -45.888 | -13.888 | x8 | y8 | z8 | 6.8 |
| | ... | ... | ... | ... | ... | ... | ... | ... | ... | ... | ... | ... |

| PRINTER (0802) | CONFIGURATION (0803) |
|---|---|
| PRINTER A | IN-LINE SENSOR BUILT INTO IMAGE FORMING APPARATUS AUTOMATIC ADJUSTMENT UNIT |
| PRINTER B | IN-LINE SENSOR BUILT INTO IMAGE FORMING APPARATUS |

| ADJUSTMENT FUNCTION (0805) | AUTOMATIC COLORIMETRIC UNIT (0806) |
|---|---|
| MONOCHROME CALIBRATION | IN-LINE SENSOR BUILT INTO IMAGE FORMING APPARATUS AUTOMATIC ADJUSTMENT UNIT |
| DFE CALIBRATION | IN-LINE SENSOR BUILT INTO IMAGE FORMING APPARATUS AUTOMATIC ADJUSTMENT UNIT |
| COLOR-TRANSFER ADJUSTMENT | AUTOMATIC ADJUSTMENT UNIT |

0804

SYSTEM, INFORMATION PROCESSING APPARATUS, AND CONTROL METHOD THEREOF COMPRISING VERIFYING COLOR BY USING A COLORIMETRIC VALUE ACQUIRED BY COLORIMETRY OF A SHEET BY AN IMAGE FORMING APPARATUS, AND DETERMINING AN ADJUSTMENT FUNCTION TO BE EXECUTED BASE ON THE COLOR VERIFICATION RESULT

BACKGROUND

Field

The present disclosure generally relates to a system for color quality verification of a printed material.

Description of the Related Art

Color quality verification is performed on a printed material printed by an image forming apparatus to verify the color quality, and an example method of the verification is that a colorimeter acquires information (colorimetric value) by reading a chart on which several color patches are printed and the information is compared with a color standard/reference established by a printing industry or a color standard/reference uniquely established by a printing company. In this method, generally, an average color difference of and a maximum color difference among all of the color patches are calculated based on a result of the comparison, and color quality is verified by determining whether the calculation result is less than or equal to an allowable value previously specified by a user. In addition to the average color difference and the maximum color difference, the conditions may also be specified from various viewpoints.

In a case where the verification result of color quality is greater than the allowable value previously specified by the user, the user adjusts the color quality of the image forming apparatus. Examples of functions for the adjustment include functions for correcting density and gradation. According to a method discussed in Japanese Patent No. 06299708, the adjustment functions are executed after verification of color quality.

In the case where a result of the color quality verification is greater than the allowable value previously specified by the user, the user checks color differences between color patches used for the color quality verification, and based on a result of the checking, determines an image quality adjustment function to be executed from among adjustment functions supported by the image forming apparatus.

In the determination, however, the user has to know which of the color patches should be checked and what kind of a result of the checking leads to the determination of which adjustment function to be executed.

SUMMARY

The present disclosure is directed to a technique with which an adjustment function to be executed by an image forming apparatus is specified based on a result of color quality verification, which eliminates the need for knowledge of users about selection of an adjustment function to be executed using a result of color validation.

According to some embodiments, a system includes at least one processor configured to function as a color verification unit configured to execute color verification by using a colorimetric value acquired by colorimetry of a sheet output by an image forming apparatus, and a determination unit configured to determine an adjustment function to be executed by the image forming apparatus or an image processing apparatus connected to the image forming apparatus from among a plurality of adjustment functions, based on a result of the color verification.

Further features of the present disclosure will become apparent from the following description of exemplary embodiments with reference to the attached drawings.

BRIEF DESCRIPTION OF THE DRAWINGS

FIGS. 3A to 3C are tables illustrating examples of information that is used for color verification according to the first exemplary embodiment.

FIG. 4 is a diagram illustrating an example of a setting screen of color verification according to the first exemplary embodiment.

FIGS. 6A and 6B are diagrams illustrating examples of screens on which a user checks a verification result acquired by a color verification method according to the first exemplary embodiment.

FIG. 7 is a table illustrating an example of a verification result acquired by the color verification method according to the first exemplary embodiment.

FIG. 8A is a table illustrating an example of configuration information of an image forming apparatus according to a second exemplary embodiment. FIG. 8B is an example of an information table in which an adjustment function of an image forming apparatus is associated with an automatic colorimetric unit according to a second exemplary embodiment.

DESCRIPTION OF THE EMBODIMENTS

Various exemplary embodiments, features, and aspects embodying the present disclosure will be described in detail below with reference to the appended drawings.

The embodiments described hereinbelow are not intended to limit the scope of the appended claims of the present disclosure, and not all of the combinations of features described in the exemplary embodiments are needed as the solutions of the present disclosure.

Figure 1:
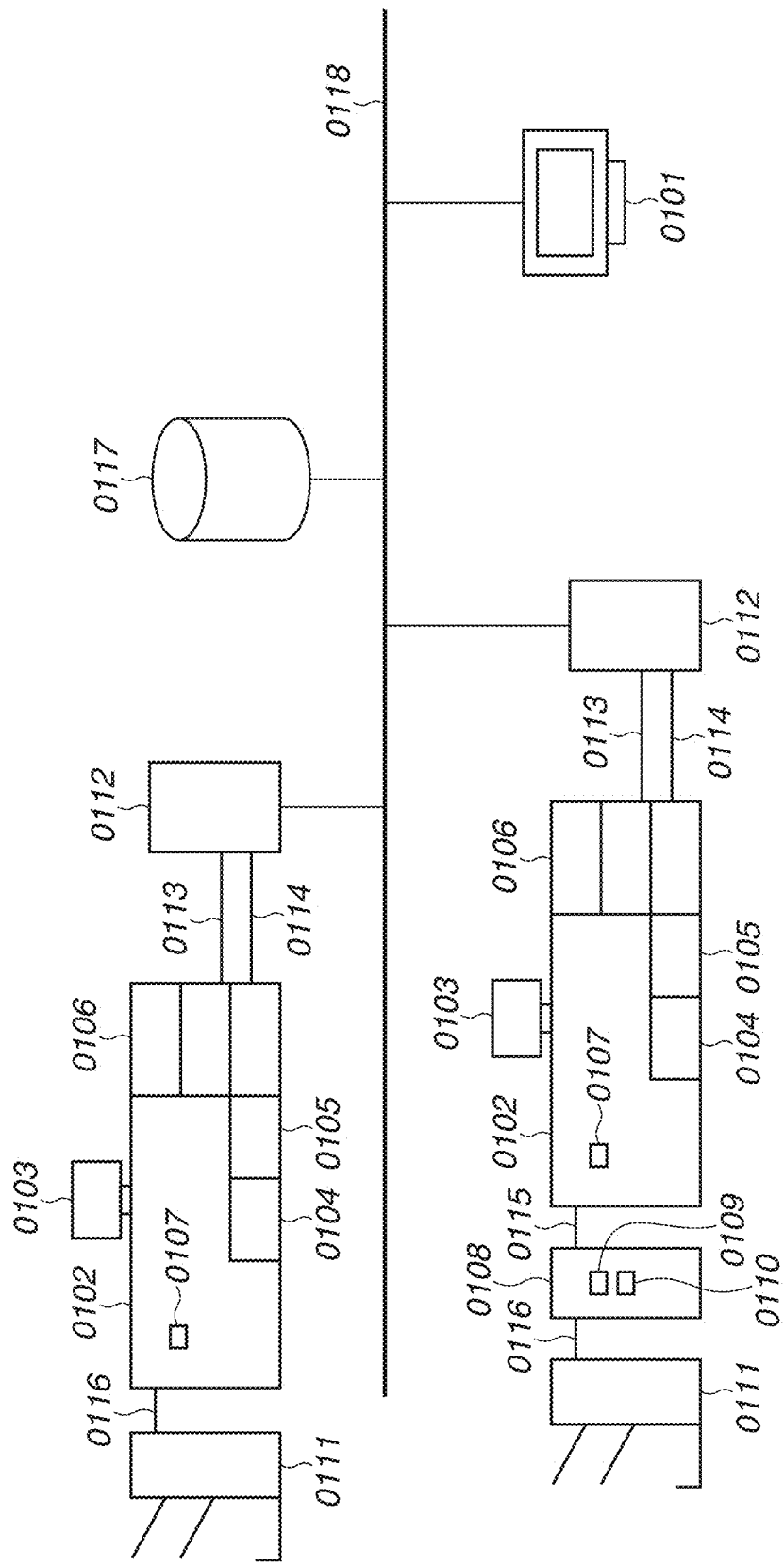
FIG. 1 is a schematic diagram illustrating a configuration of a client computer, an image forming apparatus, an image processing apparatus, and a database according to a first exemplary embodiment.

FIG. 1 is a schematic diagram illustrating a configuration of a client computer 0101, an image forming apparatus 0102, an image processing apparatus 0112, and a database 0117 according to a first exemplary embodiment.

The client computer 0101 is connected via a network 0118 to the image processing apparatus 0112 and the database 0117 that are on the same network.

Information to be used for color verification (described below in detail with reference to FIGS. 3A to 3C) and a result of the color verification are stored in the database 0117 on the network 0118, and transmitted to the client computer 0101 via the network 0118. The information to be used for the color verification and the color verification result may be stored in and managed by the client computer 0101 instead of the database 0117 on the network 0118.

When the color validation is to be executed, the client computer 0101 issues instructions to the image processing apparatus 0112 via the network 0118 based on set information to print a chart on which color patches for the color verification are printed, and to execute colorimetry of the chart to perform color verification.

The image forming apparatus 0102 is connected to the image processing apparatus 0112 via cables 0113 and 0114. The image forming apparatus 0102 includes a user interface (UI) panel 0103, sheet feeding decks 0104 and 0105, and a spectroscopic sensor 0107. An option deck 0106 configured of three sheet feeding stages is further connected to the image forming apparatus 0102. The image forming apparatus 0102 is an electrophotographic-type image forming apparatus, for example. The UI panel 0103 is a user interface having an electrostatic capacitance-type touch panel, for example. The spectroscopic sensor 0107 is a sensor which acquires information by irradiating an object with light and measuring reflection, diffusion, and absorption of a spectrum of the light, and colorimetry of color of a printed material can be executed by using the spectroscopic sensor 0107.

The image forming apparatus 0102 further includes an automatic adjustment unit 0108 and a discharge apparatus 0111. The automatic adjustment unit 0108 is connected to the image forming apparatus 0102 via a cable 0115. The automatic adjustment unit 0108 includes two sensors (reading units), of a spectroscopic sensor 0109 and a contact image sensor (CIS) 0110. The spectroscopic sensor 0109 has functions similar to the functions of the spectroscopic sensor 0107 included in the image forming apparatus 0102. The CIS 0110 functions as an image reading sensor. The discharge apparatus 0111 is connected to the image forming apparatus 0102 or the automatic adjustment unit 0108 via a cable 0116. Further, the discharge apparatus 0111 includes a plurality of discharge trays, and printed materials printed by the image forming apparatus 0102 can be stacked on the discharge trays.

A print job is generated by the client computer 0101, transmitted to the image processing apparatus 0112 via the network 0118, and managed by the image processing apparatus 0112. The print job managed by the image processing apparatus 0112 is transmitted to the image forming apparatus 0102 from the image processing apparatus 0112 via the cables 0113 and 0114, and the image forming apparatus 0102 executes processing for printing an image on a sheet of paper (i.e., sheet). The print job may be generated and managed by the image processing apparatus 0112, transmitted to the image forming apparatus 0102 via the cables 0113 and 0114, and managed by the image forming apparatus 0102. Further, the number of the image forming apparatuses 0102 on the network 0118 may be one or more than one.

A connection mode of the client computer 0101, the image forming apparatus 0102, the image processing apparatus 0112, and the database 0117 described in the present exemplary embodiment is merely an example, and various connection modes other than the connection mode described in the present exemplary embodiment can be employed.

Figure 2:
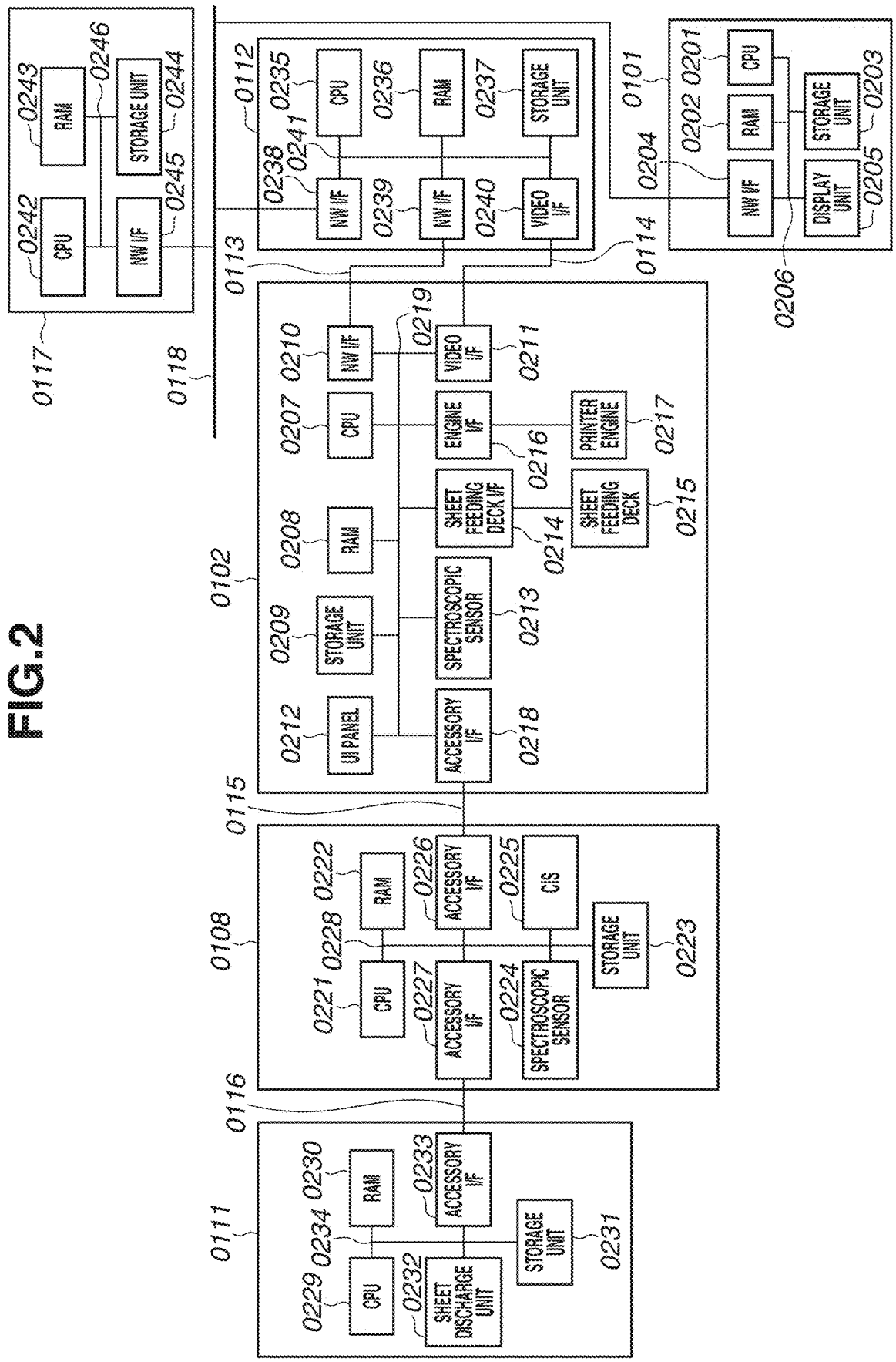
FIG. 2 is a block diagram illustrating the client computer, the image forming apparatus, the image processing apparatus, and the database according to the first exemplary embodiment.

FIG. 2 is a block diagram illustrating a control configuration of the client computer 0101, the image forming apparatus 0102, the image processing apparatus 0112, and the database 0117 according to the present exemplary embodiment.

A central processing unit (CPU) 0201, which includes one or more processors, circuitry, or combinations thereof, controls operation and calculation of each unit of the client computer 0101 via a system bus 0206. The CPU 0201 executes a program stored in a storage unit 0203 and loaded on a random access memory (RAM) 0202. The RAM 0202 is one type of general volatile storage device directly accessible from the CPU 0201. The RAM 0202 is used as a work area or a temporary data storage area of the CPU 0201. The storage unit 0203 functions as a temporary storage area and a work memory when the client computer 0101 executes operation. A network interface (hereinafter, called "NW I/F") 0204 is connected to a NW I/F 0238 of the image processing apparatus 0112 on the network 0118 via the network 0118, and controls communication between the client computer 0101 and the image processing apparatus 0112. The NW I/F 0204 is also connected to a NW I/F 0245 of the database 0117 on the network 0118 via the network 0118, and controls communication between the client computer 0101 and the database 0117. A display unit 0205 is a hardware configuration which functions as a user interface for visually displaying internal information of the client computer 0101. For example, the display unit 0205 is a monitor. As used herein, the term "unit" generally refers to any combination of hardware, firmware, software, or other component that is used to effectuate a purpose.

A CPU 0207, which includes one or more processors, circuitry, or combinations thereof, controls operation and calculation of each unit of the image forming apparatus 0102 via a system bus 0219. The CPU 0207 executes a program stored in a storage unit 0209 and loaded on a RAM 0208. The RAM 0208 is one type of general volatile storage device directly accessible from the CPU 0207. The RAM 0208 is used as a work area or a temporary data storage area of the CPU 0207. The storage unit 0209 functions as a temporary storage area and a work memory when the image forming apparatus 0102 executes operation.

A NW I/F 0210 is connected to a NW I/F 0239 of the image processing apparatus 0112 via the cable 0113, and controls communication between the image forming apparatus 0102 and the image processing apparatus 0112.

A video I/F 0211 is connected to a video I/F 0240 via the cable 0114 for video, and controls image data communication between the image forming apparatus 0102 and the image processing apparatus 0112.

A UI panel 0212 is a hardware configuration of the UI panel 0103, and functions as a user interface on which a user performs a general operation of the image forming apparatus 0102. In the present exemplary embodiment, the UI panel 0212 includes an electrostatic capacitance-type touch panel. A spectroscopic sensor 0213 is a hardware configuration of the spectroscopic sensor 0107, and performs colorimetry of color of a printed material printed by the image forming apparatus 0102.

A sheet feeding deck I/F 0214 controls operation of and communication with a sheet feeding deck 0215. The sheet feeding deck 0215 is a general term of the hardware configuration which includes the sheet feeding decks 0104 and 0105 and the option deck 0106. An engine I/F 0216 controls operation of and communication with a printer engine 0217.

An accessory I/F 0218 is connected to accessory I/Fs 0226 and 0233 via the cables 0115 and 0116. In other words, the image forming apparatus 0102 mutually communicates with the automatic adjustment unit 0108 and the discharge apparatus 0111 via the accessory I/Fs 0218, 0226, and 0233.

A CPU 0221, which includes one or more processors, circuitry, or combinations thereof, controls operation and calculation of each unit of the automatic adjustment unit 0108 via a system bus 0228. The CPU 0221 executes a program stored in a storage unit 0223 and loaded on a RAM 0222. The RAM 0222 is one type of general volatile storage device directly accessible from the CPU 0221. The RAM 0222 is used as a work area or a temporary data storage area of the CPU 0221. The storage unit 0223 functions as a temporary storage area and a work memory when a colorimetric operation and an adjustment operation are executed. A spectroscopic sensor 0224 is a hardware configuration of the spectroscopic sensor 0109, and performs colorimetry of color of a printed material printed by the image forming apparatus 0102. A CIS 0225 is a hardware configuration of the CIS 0110, and captures an image of a printed material printed by the image forming apparatus 0102.

The accessory I/F 0226 is connected to the accessory I/F 0218 via the cable 0115, and controls communication between the automatic adjustment unit 0108 and the image forming apparatus 0102. An accessory I/F 0227 is connected to the accessory I/F 0233 via the cable 0116, and controls communication between the automatic adjustment unit 0108 and the discharge apparatus 0111.

A CPU 0229, which includes one or more processors, circuitry, or combinations thereof, controls operation and calculation of each unit of the discharge apparatus 0111 and executes a program stored in a storage unit 0231 and loaded on a RAM 0230 via a system bus 0234. The RAM 0230 is one type of general volatile storage device directly accessible from the CPU 0229. The RAM 0230 is used as a work area or a temporary data storage area of the CPU 0229. The storage unit 0231 functions as a temporary storage area and a work memory when the discharge apparatus 0111 executes operation. A sheet discharge unit 0232 monitors and controls a discharge operation and a stacking state of each of the discharge trays included in the discharge apparatus 0111.

The accessory I/F 0233 is connected to the accessory I/Fs 0218 and 0227 via the cables 0115 and 0116. In other words, the discharge apparatus 0111 mutually communicates with the image forming apparatus 0102 and the automatic adjustment unit 0108 via the accessory I/Fs 0233, 0218, and 0227.

A_CPU 0235, which includes one or more processors, circuitry, or combinations thereof, controls operation and calculation of each unit of the image processing apparatus 0112 and executes a program stored in a storage unit 0237 and loaded on a RAM 0236 via a system bus 0241. The RAM 0236 is one type of general volatile storage device directly accessible from the CPU 0235. The RAM 0236 is used as a work area or a temporary data storage area of the CPU 0235. The storage unit 0237 functions as a temporary storage area and a work memory when the image processing apparatus 0112 executes operation. The NW I/F 0238 is connected to the NW I/Fs 0204 and 0245 via the network 0118. The image processing apparatus 0112 communicates with the client computer 0101 via the NW I/Fs 0238 and 0204.

The image processing apparatus 0112 communicates with the database 0117 via the NW I/Fs 0238 and 0245. The NW I/F 0239 is connected to the NW I/F 0210 of the image forming apparatus 0102 via the cable 0113, and controls communication between the image processing apparatus 0112 and the image forming apparatus 0102. The video I/F 0240 is connected to the video I/F 0211 via the cable 0114 for video, and controls image data communication between the image processing apparatus 0112 and the image forming apparatus 0102.

A CPU 0242, which includes one or more processors, circuitry, or combinations thereof, controls operation and calculation of each unit of the database 0117 via a system bus 0246. The CPU 0242 executes a program stored in a storage unit 0244 and loaded on a RAM 0243. The RAM 0243 is one type of general volatile storage device directly accessible from the CPU 0242. The RAM 0243 is used as a work area or a temporary data storage area of the CPU 0242. The storage unit 0244 functions as a temporary storage area and a work memory when the database 0117 executes operation. The NW I/F 0245 is connected to the NW I/F 0204 of the client computer 0101 on the network via the network 0118, and controls communication between the database 0117 and the client computer 0101. The NW I/F 0245 is connected to the NW I/F 0238 of the image processing apparatus 0112 on the network via the network 0118, and controls communication between the database 0117 and the image processing apparatus 0112.

FIGS. 3A to 3C are tables of examples of information for use in color verification and information about an adjustment function to be executed when a result of color verification is "no good (NG)" which are stored in the database 0117. These pieces of information are stored in the storage unit 0244 of the database 0117.

FIG. 3A illustrates an example of an information table 0301 storing color reference data for use in color verification. The information table 0301 stores various pieces of information on color references for use in color verification. A Reference ID 0302 is identification (ID) information for uniquely identifying each of the stored color references. While, in the example in FIG. 3A, the Reference ID 0302 is expressed by a four digit number, the Reference ID 0302 can be expressed in various ways, such as a combination of random letters. A Reference Name 0303 is a name of each of the stored color references.

A Printer 0304 indicates a printer (image forming apparatus 0102) that is be used for printing the color reference to execute color verification. An Allowable value 0305 indicates allowable values of an average color difference and a maximum color difference set for each of the stored color references. While, in the example in FIG. 3A, the average color difference and the maximum color difference are stored as allowable values, other allowable values, such as an average color difference of a gray area, may also be stored.

FIG. 3B illustrates an example of an information table 0306 storing data of association of color reference values with various color patches for corresponding one of the color references illustrated in FIG. 3A. The information table 0306 is a table in which color patches and reference values are associated with each other. A Reference ID 0307 is ID information to indicate an association of the information table 0306 with a color reference. In the example of FIG. 3B, since the Reference ID 0307 indicates "0005" which coincides with one of the ID information in Reference ID 0302, the information table 0306 corresponds to a color reference named "Company's Own Reference". A Patch ID 0308 is ID information for identifying each color patch. In items 0309, 0310, 0311, and 0312, signal values from 0 to 100 of printing colors of cyan (C), magenta (M), yellow (Y), and black (K), respectively, are stored. In items 0313, 0314, and 0315, reference values (Lab values) in a Lab color space in a combination of the signal values C, M, Y, and K, set for the color reference are stored. In the example of FIG. 3B, reference values of L=91.111, a=−48.111, and b=−14.111 are stored to be used in a case of a combination of signal values of C=100 and M/Y/K=0. The reference values set in each table are different among the color references.

FIG. 3C illustrates an association table 0316 which is an example of data that describes details of an item of a color verification result to be checked when the color verification result does not satisfy allowable values in the allowable value 0305 of a color reference in the reference ID 0302, and an adjustment function(s) to be executed when the item does not satisfy the allowable values in the allowable value 0305.

The association table 0316 stores an association of details of an item of a color verification result to be checked when the color verification result does not satisfy allowable values in the allowable value 0305 of a color reference in the reference ID 0302 with an adjustment function(s) to be executed when the item does not satisfy the allowable values in the allowable value 0305. A Detailed NG Item 0317 is the details of an item of a color verification result to be checked when the color verification result does not satisfy the allowable values in the allowable value 0305 of the color reference indicated in the reference ID 0302. In the example of FIG. 3C, three items including color patches of CMYK in monochrome 100%, color patches of CMYK in gradation of 0% to 100%, and color patches in RGB (secondary color) 100% are stored as the items to be checked. With reference to FIG. 3B, color patches 1, 2, 3, and 4 in the Patch ID 0308 correspond to the color patches of CMYK in monochrome 100%. A color patch 8 in the Patch ID 0308 corresponds to a color patch of CMYK in gradation of 0% to 100%. Color patches 5, 6, and 7 in the Patch ID 0308 correspond to color patches in RGB (secondary color) 100%. An Adjustment function 0318 indicates an adjustment function(s) to be executed when an item described in the Detailed NG Item 0317 does not satisfy allowable values in the allowable value 0305 of a color reference in the reference ID 0302. In the example of FIG. 3C, in a case where a color verification result to be checked is "Color Patches of CMYK in Monochrome 100%" in the Detailed NG Item 0317, monochrome calibration in the adjustment function 0318 is a function to be executed. In a case where a color verification result to be checked is "Color Patches of CMYK in Gradation of 0% to 100%" in the Detailed NG Item 0317, monochrome calibration and DFE calibration in the adjustment function 0318 are functions to be executed. In a case where a color verification result to be checked is "Color Patches in RGB (secondary color) 100%" in the Detailed NG Item 0317, the adjustment function 0318 is a function to be executed. The monochrome calibration is the adjustment function that is executed by the image forming apparatus 0102 to correct the maximum density and the gradation of CMYK. The monochrome calibration is also called automatic gradation correction.

Color patches of CMYK in monochrome 100% is printed, colorimetry is executed on the printed sheet, densities of the color patches are compared with the maximum density held in the image forming apparatus 0102, and the image forming apparatus 0102 executes an adjustment to properly output the maximum density. Next, color patches of CMYK gradually divided in gradation of 0% to 100% is printed, colorimetry is executed on the color patches, gradation of the color patches are checked, and the image forming apparatus 0102 executes an adjustment when desired. The DFE calibration is an adjustment function that is to adjust the gradation of CMYK and is executed by an apparatus (image processing apparatus 0112) called "Digital Front-End (DFE)" connected to the image forming apparatus 0102. The color patches of CMYK gradually divided in gradation of 0% to 100% is printed, colorimetry is executed on the color patches, gradation of the color patches are checked, and the DFE adjusts CMYK of print data to output ideal gradation. In the present exemplary embodiment, the DFE is expressed and described as the image processing apparatus 0112. The DFE is an apparatus which mainly executes processing on print job data to be input to the image forming apparatus 0102. Specifically, the DFE functions as one type of server which executes an adjustment, editing, high-speed raster image processing (RIP), storage, and management of print job data received from the client computer 0101. The color-transfer adjustment is an adjustment function that is to adjust a transfer condition of color poorly transferred to a printed material and is executed by the image forming apparatus 0102. The color-transfer adjustment is also called secondary transfer voltage adjustment. Adjusting a transfer condition of toner transferred to a printed material leads to proper output of a secondary color (RGB). The Detailed NG Item 0317 and the Adjustment Function 0318 described above are merely examples. While, in the present exemplary embodiment, the association table 0316 in which the Detailed NG Item 0317 and the Adjustment Function 0318 are associated with each other is defined previously, the user may provide user's own definitions.

The processing of an adjustment function execution method according to the present exemplary embodiment, which is executed when an allowable value is not satisfied in color verification, will be described with reference to FIGS. 4, 5A, 5B, 6A, 6B, and 7.

FIG. 4 illustrates a color verification setting screen 0401 that is displayed when color verification is to be executed. The CPU 0201 of the client computer 0101 displays the color verification setting screen 0401 on the display unit 0205 of the client computer 0101. The color verification setting screen 0401 is a color reference selection screen on which a color reference to be used in color verification is selected. An item 0402 is a message notifying the user that a color reference can be selected from the color verification setting screen 0401. An input area 0403 receives an input of a reference ID. Although a target color reference can be selected from a list of color references described below, the user can input a reference ID to the input area 0403 and press a CONFIRM button 0404 to select a color reference coinciding with the reference ID input to the input area 0403. A table 0405 has Reference IDs and reference names held in the system. The pieces of information in the Reference ID 0302 and the Reference Name 0303 of the information table 0301 of color verification information in FIG. 3A are indicated in the table 0405. In the example in FIG. 4, a reference ID "0005" and a reference name "Company's Own Reference" are selected as information about color verification to be executed. The subsequent processing is executed when a START COLORIMETRY button 0406 is pressed. The CPU 0201 of the client computer 0101 issues instructions to cause the image forming apparatus 0102 and the image processing apparatus 0112 to print a chart according to the set color verification information and start colorimetry using the spectroscopic sensors 0107 and 0109.

Figure 5A:
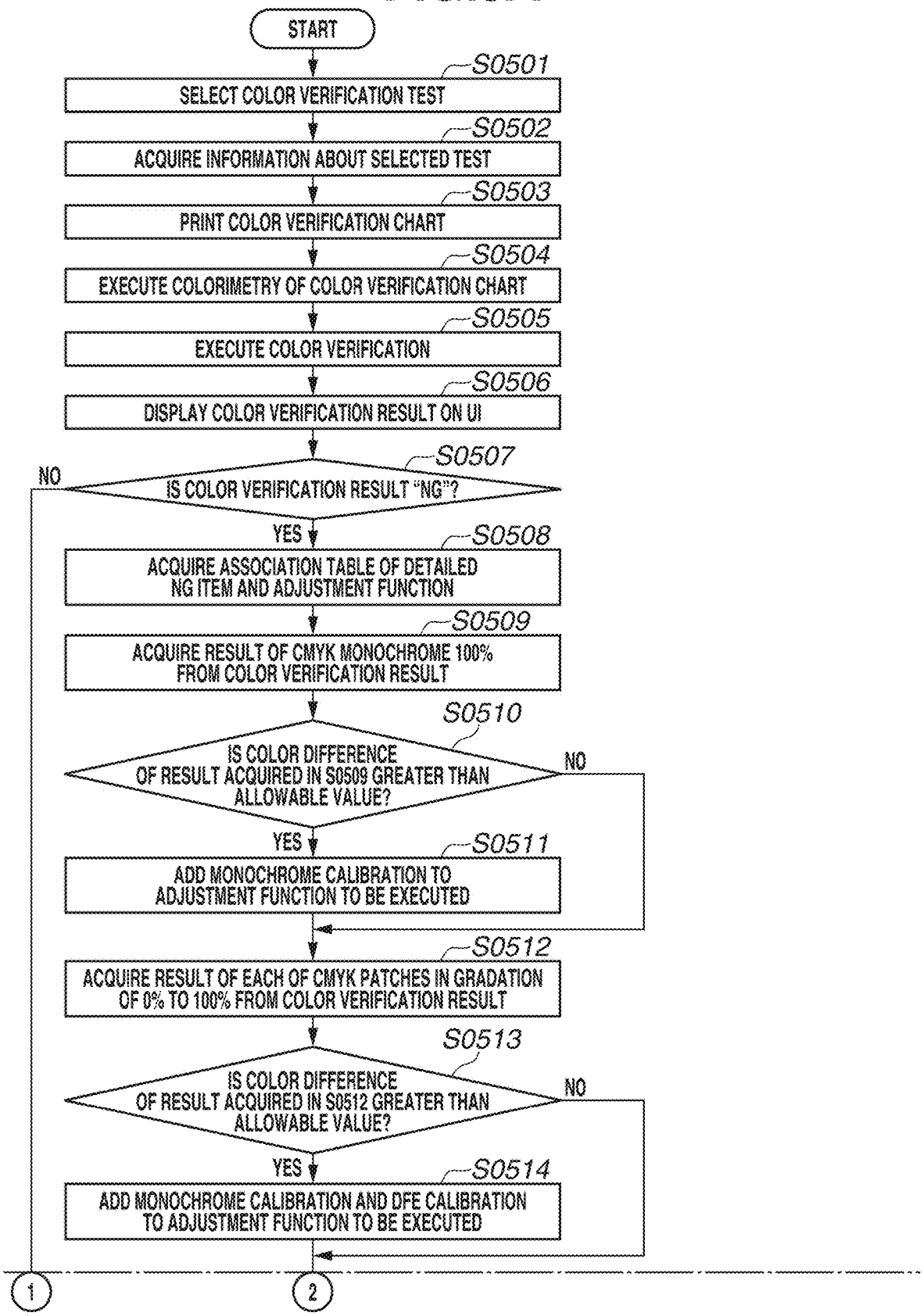
FIGS. 5A and 5B are flowcharts illustrating processing of an adjustment function execution method, according to the first exemplary embodiment, that is executed when a result of the color verification does not satisfy an allowable value.
Figure 5B:
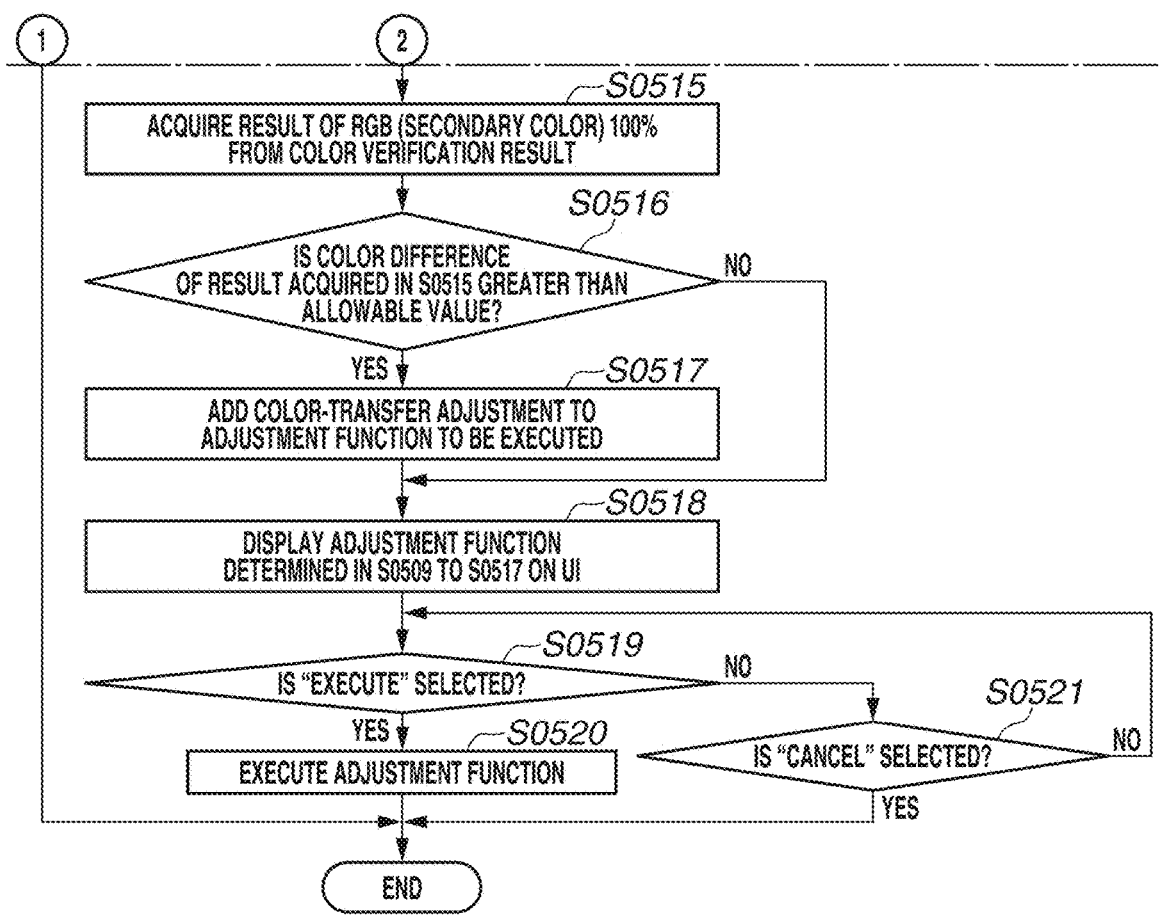

FIGS. 5A and 5B are flowcharts illustrating processing for executing an adjustment function when an allowable value is not satisfied in color verification. The below-described processing is executed by the CPU 0201 of the client computer 0101, the CPU 0207 of the image forming apparatus 0102, the CPU 0235 of the image processing apparatus 0112, and the CPU 0242 of the database 0117.

In step S0501, the CPU 0201 of the client computer 0101 acquires a color reference set by the user on the color verification setting screen in FIG. 4 from the database 0117 via the network 0118, and stores the acquired color reference in the RAM 0202. Next, in step S0502, from the color reference acquired in step S0501, the CPU 0201 of the client computer 0101 acquires information about a printer (0304) and allowable values (0305), and information about color patches to be used for color verification and reference values of the color patches stored in the information table 0306.

In step S0503, based on the information acquired in step S0502, the CPU 0201 of the client computer 0101 creates chart data to be used for color verification. Then, the CPU 0201 transmits the chart data to the image forming apparatus 0102 and the image processing apparatus 0112 as a print job via the network 0118. The CPU 0207 of the image forming apparatus 0102 and the CPU 0235 of the image processing apparatus 0112 execute printing of the chart data for color verification received via the network 0118. A print setting for printing the chart data is stored in the RAM 0202 of the client computer 0101.

In step S0504, the CPU 0207 of the image forming apparatus 0102 executes colorimetry of the chart data for color verification printed in step S0503 by using the spectroscopic sensor 0107. The CPU 0207 of the image forming apparatus 0102 transmits a colorimetric result (colorimetric data Lab) to the image processing apparatus 0112 via the network 0118. The CPU 0235 of the image processing apparatus 0112 transmits the received colorimetric result (colorimetric data Lab) to the client computer 0101 via the network 0118. The CPU 0201 of the client computer 0101 stores the received colorimetric result (colorimetric data Lab) in the RAM 0202. In this processing, the colorimetric result (colorimetric data Lab) may be transmitted to the database 0117 instead of the client computer 0101, and the CPU 0242 of the database 0117 may store the colorimetry result in the RAM 0243. In this case, the CPU 0201 of the client computer 0101 acquires the colorimetric result (colorimetric data Lab) from the database 0117 via the network 0118 and stores the colorimetric result in the RAM 0202. In step S0505, the CPU 0201 of the client computer 0101 calculates a color difference between the colorimetric result (colorimetric data Lab) acquired in step S0504 and reference values Lab of the color reference acquired in step S0502, and stores the calculation result in the RAM 0202. The information stored in this processing will be described below with reference to FIG. 7. Examples of the color difference calculation method include various formulas, such as CIE76, CIE96, and CIE 2000, and any formulas can be used.

In step S0506, based on the calculation result of the color difference acquired in step S0505, the CPU 0201 of the client computer 0101 calculates an average color difference and a maximum color difference of all of the color patches, stores the calculation result in the RAM 0202, and displays the calculation result on the display unit 0205. A screen to be displayed in this processing will be described below with reference to FIGS. 6A and 6B. The average color difference and the maximum color difference can be calculated by a general calculation method, and the descriptions are omitted.

Next, in step S0507, the CPU 0201 of the client computer 0101 compares the calculated average color difference and the calculated maximum color difference with the allowable values of the average color difference and the maximum color difference, respectively, of the color reference acquired in step S0502, and determines whether the calculated color differences are greater than the respective allowable values. In a case where the CPU 0201 determines that the calculated color difference is greater than the allowable value (YES in step S0507), the processing proceeds to step S0508. In a case where the CPU 0201 determines that the calculated color difference is less than or equal to the allowable value (NO in step S0507), the processing of color verification is ended.

In step S0508, the CPU 0201 of the client computer 0101 acquires the association table 0316 storing detailed NG items and adjustment functions from the database 0117 via the network 0118, and stores the association table 0316 in the RAM 0202. In step S0509, the CPU 0201 of the client computer 0101 acquires a color verification result of each of the color patches of CMYK in monochrome 100%, which corresponds to one of the detailed NG items in the association table 0316 acquired in step S0508, from the color difference results calculated in step S0505, and stores the color verification results in the RAM 0202. In the example in FIG. 6A, because patch IDs 1, 2, 3, and 4 indicate printing colors of C 100%, M 100%, Y 100%, and K 100%, respectively, i.e., the color patches of CMYK in monochrome 100%, the CPU 0201 acquires a color difference of each of the patch IDs 1, 2, 3, and 4. Next, in step S0510, the CPU 0201 of the client computer 0101 determines whether the result (color difference) acquired in step S0509 is greater than the allowable value acquired in step S0502. In the example in FIG. 6A, the CPU 0201 determines whether the color difference of each of the patch IDs 1, 2, 3, and 4 is greater than the average color difference "3.0" of the allowable value acquired in step S0502. In a case where the CPU 0201 determines that the color difference of each of the color patches of CMYK in monochrome 100% is greater than the allowable value acquired in step S0502 (YES in step S0510), the processing proceeds to step S0511. On the other hand, in a case where the CPU 0201 determines that the color difference of each of the color patches of CMYK in monochrome 100% is less than or equal to the allowable value acquired in step S0502 (NO in step S0510), the processing proceeds to step S0512. In the example in FIG. 6A, because the color difference of each of the patch IDs 3 and 4, i.e., printing colors of C 100% and K 100%, is "4" which is greater than the average color difference "3.0" of the allowable values acquired in step S0502, the processing proceeds to step S0511.

In step S0511, from the association table 0316 storing detailed NG items and adjustment functions acquired in step S0508, the CPU 0201 of the client computer 0101 stores the monochrome calibration as the adjustment function to be executed in the RAM 0202. In the example in FIG. 6A, because the color difference of each of the patch IDs 3 and 4, i.e., printing colors of Y 100% and K 100%, is "4" which is greater than the average color difference "3.0" of the allowable value acquired in step S0502, the CPU 0201 stores the monochrome calibration as the adjustment function to be executed. Next, in step S0512, the CPU 0201 of the client computer 0101 acquires color verification results of the color patches of CMYK in gradation of 0% to 100%, and stores the color verification results in the RAM 0202. Specifically, the CPU 0201 acquires color verification results of the color patches of CMYK in gradation of 0% to 100%, which corresponds to one of the detailed NG items acquired in step S0508, from the color difference results calculated in step S0505. In the example in FIG. 6A, the CPU 0201 acquires the color difference of the patch ID 8 because a patch ID 8 indicates gradation of C 80%, i.e., a color patch of cyan in gradation of 0% to 100%. In step S0513, the CPU 0201 of the client computer 0101 determines whether the result (color difference) acquired in step S0512 is greater than the allowable value acquired in step S0502. In the example in FIG. 6A, the CPU 0201 determines whether the color difference of the patch ID 8 is greater than the average color difference "3.0" of the allowable value acquired in step S0502. In a case where the CPU 0201 determines that the color difference of each of the color patches of CMYK in gradation 0% of to 100% is greater than the allowable value acquired in step S0502 (YES in step S0513), the processing proceeds to step S0514. On the other hand, in a case where the CPU 0201 determines that the color difference of each of the color patches of CMYK in gradation of 0% to 100% is less than or equal to the allowable value acquired in step S0502 (NO in step S0513), the processing proceeds to step S0515. In the example in FIG. 6A, because the color difference of the patch ID 8, i.e., gradation of C 80%, is "6.8" which is greater than the average color difference "3.0" of the allowable value acquired in step S0502, the processing proceeds to step S0514. As described above, the CPU 0201 checks the color difference of each of the color patches of CMYK in gradation of 0% to 100%.

In step S0514, the CPU 0201 of the client computer 0101 stores the monochrome calibration and the DFE calibration as the adjustment functions to be executed in the RAM 0202. Specifically, from the association table 0316 storing detailed NG items and adjustment functions acquired in step S0508, the CPU 0201 specifies the monochrome calibration and the DFE calibration as the adjustment functions to be executed. In the example in FIG. 6A, because the color difference of the patch ID 8, i.e., gradation of C 80%, is "6.8" which is greater than the average color difference "3.0" of the allowable value acquired in step S0502, the CPU 0201 specifies the monochrome calibration and the DFE calibration as the adjustment functions to be executed. In step S0515, the CPU 0201 of the client computer 0101 acquires color verification results of the color patches in RGB (secondary color) 100%, which corresponds to one of the detailed NG items acquired in step S0508, and stores the color verification results in the RAM 0202. In the example in FIG. 6A, the patch IDs 5, 6, and 7 correspond to printing colors of C 100% and M 100% (i.e., Blue 100%), C 100% and Y 100% (i.e., Green 100%), and M 100% and Y 100& (i.e., Red 100%), respectively. Since the patch IDs 5, 6, and 7 correspond to the color patches in RGB (secondary color) 100%, the CPU 0201 acquires the color difference of each of the patch IDs 5, 6, and 7. Next, in step S0516, the CPU 0201 of the client computer 0101 determines whether the result (color difference) acquired in step S0515 is greater than the allowable value acquired in step S0502. In the example in FIG. 6A, the CPU 0201 determines whether the color difference of each of the patch IDs 5, 6, and 7 is greater than the average color difference "3.0" of the allowable value acquired in step S0502. In a case where the CPU 0201 determines that the result (color difference) acquired in step S0515 is greater than the allowable value acquired in step S0502 (YES in step S0516), the processing proceeds to step S0517. In a case where the CPU 0201 determines that the result (color difference) acquired in step S0515 is less than or equal to the allowable value acquired in step S0502 (NO in step S0516), the processing proceeds to step S0518. In the example in FIG. 6A, because the color difference of the patch ID 5, i.e., printing color of C 100% and M 100% (Blue 100%), is "5" which is greater than the average color difference "3.0" of the allowable value acquired in step S0502, the processing proceeds to step S0517.

In step S0517, from the association table 0316 storing detailed NG items and adjustment functions acquired in step S0508, the CPU 0201 of the client computer 0101 stores the color-transfer adjustment as the adjustment function to be executed in the RAM 0202. In the example in FIG. 6A, because a color difference of the patch ID 5, i.e., printing color of C 100% and M 100% (Blue 100%), is "5" which is greater than the average color difference "3.0" of the allowable value acquired in step S0502, the CPU 0201 stores the color-transfer adjustment as the adjustment function to be executed.

In step S0518, the CPU 0201 of the client computer 0101 displays a list of adjustment functions, which have been extracted in steps S0509 to S0517 and stored in the RAM 0202, on the display unit 0205. A screen 0606 to be displayed in this processing will be described below with reference to FIG. 6B. In step S0519, the CPU 0201 of the client computer 0101 determines whether an EXECUTE button 0610 is selected on the screen 0606 displayed in step S0518. In a case where the CPU 0201 determines that the EXECUTE button 0610 is selected on the screen displayed in step S0518 (YES in step S0519), the processing proceeds to step S0520. In a case where the CPU 0201 determines that the EXECUTE button 0610 is not selected on the screen displayed in step S0518 (NO in step S0519), the processing proceeds to step S0521.

In step S0520, the CPU 0201 of the client computer 0101 issues an instruction via the network 0118 to cause the image forming apparatus 0102 and the image processing apparatus 0112 to execute the adjustment function(s) to be executed which is displayed in step S0518. The CPU 0207 of the image forming apparatus 0102 and the CPU 0235 of the image processing apparatus 0112 execute the adjustment function(s) based on the received instruction on the adjustment function(s). Then, the processing is ended. In step S0521, the CPU 0201 of the client computer 0101 determines whether a CANCEL button 0609 is selected on the screen 0606 displayed in step S0518. In a case where the CPU 0201 of the client computer 0101 determines that the CANCEL button 0609 is selected on the screen 0606 displayed in step S0518 (YES in step S0521), the CPU 0201 closes the displayed screen and ends the processing. In a case where the CPU 0201 determines that the CANCEL button 0609 is not selected on the screen 0606 displayed in step S0518 (NO in step S0521), the processing returns to step S0519.

FIG. 6B illustrates the screen 0606, which displays the color verification result and the adjustment functions to be executed, of a case in which an allowable value is not satisfied in color verification.

FIG. 6A illustrates a screen 0601, displayed in step S0506 in FIG. 5A, on which the user checks a color verification result. The screen 0601 is a screen for the color verification result checking. An item 0602 indicates a name of a color reference used in the color verification. The item 0602 displays the name of the color reference selected in step S0501 in FIG. 5A. An information table 0603 stores a reference value, colorimetric data acquired by a colorimeter, and a color difference between the reference value and the colorimetric data. While, in the example in FIG. 6A, the colorimetric data is expressed with letters x, y, and z, numerical values are actually displayed instead of the letters. An area 0604 displays results of comparison between the allowable values of the color reference acquired in step S0502 of FIG. 5A and the average color difference and the maximum color difference calculated in step S0505 of FIG. 5A. In a case where all of the allowable values are satisfied, "OK" is displayed as the comprehensive verification result. In a case where any one of the conditions is not satisfied, "NG" is displayed as the comprehensive verification result. In a case where a CLOSE button 0605 is pressed, the screen 0601 displaying the color verification result is closed.

FIG. 6B illustrates the screen 0606, which displays a list of adjustment functions to be executed, of a case where the adjustment functions are to be executed because the allowable values are not satisfied in the color verification. The screen 0606 is superimposed and displayed on the screen 0601 in FIG. 6A. The screen 0606 displays the list of adjustment functions to be executed. An item 0607 notifies that the adjustment functions listed and displayed on the screen 0606 is functions to be executed. An item 0608 is the list of adjustment functions to be executed which have been extracted in steps S0509 to S0514. In a case where the CANCEL button 0609 is pressed, the adjustment functions are not executed, and the display transition to the screen 0601 for the color verification result checking in FIG. 6A is performed. In a case where the EXECUTE button 0610 is pressed, the CPU 0201 of the client computer 0101 issues an instruction via the network 0118 to cause the image forming apparatus 0102 and the image processing apparatus 0112 to execute the adjustment functions displayed in the list.

FIG. 7 illustrates an example of an information table 0701 storing a color verification result of the color patches which is stored in the storage unit 0244 of the database 0117 or the storage unit 0203 of the client computer 0101. The information table 0701 stores patch information, reference values, colorimetric data, and a color difference, for each of the color patches. A Result ID 0702 is ID information for identifying each color verification result stored in the storage unit 0244. While, in the example illustrated in FIG. 7, the ID information is expressed by a four digit number, the ID information can be expressed in various ways including a combination of random letters. The color verification result is identified based on the Result ID 0702. Items 0703, 0704, 0705, 0706, 0707, 0708, 0709, and 0710 are a patch ID, signal values of C, M, Y, and K, and reference values in the Lab color space described in FIG. 3B, respectively. Because the items 0703 to 0710 have already been described above, the redundant descriptions are omitted. Items 0711, 0712, and 0713 are colorimetric data acquired from the colorimetry executed on the color patches in step S0504. While, in the example illustrated in FIG. 7, the colorimetric data is expressed with letters x, y, and z, numerical values are actually displayed as the colorimetric data. An item 0714 is a color difference between the reference values (i.e., items 0708, 0709, and 0710) and the colorimetric data (i.e., items 0711, 0172, and 0713). A result of the color difference calculated in step S0505 in FIG. 5A is stored in the item 0714. Values of the color differences illustrated in FIG. 7 are merely examples.

As described above, in a case where the color verification result does not satisfy the allowable value when color verification is executed, the CPU 0201 checks the color difference of each of the color patches used for the color verification, and creates a list of previously-defined adjustment functions to be executed based on the checking result, and then, the CPU 0201 issues an instruction to execute the adjustment functions displayed in the list. With this configuration, in a case where a color verification result does not satisfy the allowable value, the user can execute an adjustment function(s) without precisely checking the color patches used for the color verification and determining the adjustment function(s) to be executed. In the present exemplary embodiment, when the adjustment function is to be executed, the CPU 0201 displays a screen to prompt the user to determine whether to execute the adjustment function(s). However, the CPU 0201 may execute the adjustment function(s) without displaying a list of adjustment functions on a screen. In this way, the user does not have to determine whether to execute the adjustment functions, so that color verification and color adjustment can be executed more efficiently.

When the adjustment function(s) is to be executed, an adjustment may be manually executed by the user, or may be executed by automatically executing colorimetry of a chart. Further, when colorimetry is executed automatically, there are provided two methods including a method using the spectroscopic sensor 0107 in the image forming apparatus 0102 and a method using the spectroscopic sensor 0109 and the CIS 0110 in the automatic adjustment unit 0108 provided as an attachment unit. Furthermore, when an adjustment is to be executed by using an automatic colorimetric unit, some of the adjustment functions can only be executed by the spectroscopic sensor 0109 and the CIS 0110 in the automatic adjustment unit 0108, while the others can be executed by either of the spectroscopic sensor 0107 in the image forming apparatus 0102 or the spectroscopic sensor 0109 and the CIS 0110 in the automatic adjustment unit 0108. As illustrated in FIG. 1, the automatic adjustment unit 0108 includes the spectroscopic sensor 0109 and the CIS 0110, and some of the adjustment functions can be executed by using only the CIS 0110 in the automatic adjustment unit 0108.

Therefore, as described in the first exemplary embodiment, in a case where a color verification result does not satisfy allowable values, the user has to check a color difference for each of color patches used for color verification, and has to determine which automatic colorimetric unit is to be used for automatic execution of a previously defined adjustment function(s).

In a second exemplary embodiment, an adjustment function(s) is associated with, in addition to details of an item of a color verification result to be checked, the automatic colorimetric unit capable of automatically executing the adjustment function(s). With this configuration, the automatic colorimetric unit is specified based on the pieces of information and the adjustment function(s) is automatically executed.

A description will be given of the processing of the adjustment function execution method according to the second exemplary embodiment, in which an adjustment function(s) is associated with an automatic colorimetric unit, which is executed when allowable values are not satisfied in color verification with reference to FIGS. 8A, 8B, 9A, 9B, and 10.

FIG. 8A is an example of an information table 0801 that is held in the database 0117 and stores data of configuration information of the image forming apparatus 0102, an adjustment function(s), and an automatic colorimetric unit which are associated with each other. The above-described pieces of information are held in the storage unit 0244 of the database 0117.

FIG. 8A illustrates an example of the information table 0801 storing configuration information of the image forming apparatus 0102. The information table 0801 stores types and configurations of the image forming apparatuses 0102 existing on the same network.

A Printer 0802 indicates the image forming apparatuses 0102 existing on the same network. In the example in FIG. 8A, two image forming apparatuses 0102 including a "Printer A" and a "Printer B" exist on the network. A Configuration 0803 indicates configuration information describing an automatic colorimetric unit included in the image forming apparatus 0102. In the example in FIG. 8A, "Printer A" includes two automatic colorimetric units, which are an in-line sensor built into the image forming apparatus and an automatic adjustment unit 0108, and "Printer B" includes an automatic colorimetric unit, which is an in-line sensor built into the image forming apparatus. The in-line sensor built into the image forming apparatus refers to the spectroscopic sensor 0107 described in FIG. 1. The configuration information may previously be held in the storage unit 0244 of the database 0117, or may dynamically be acquired from the image forming apparatus 0102 via the network 0118.

FIG. 8B illustrates an example of an information table 0804 in which an adjustment function is associated with an automatic colorimetric unit. The information table 0804 associates an adjustment function with an automatic colorimetric unit capable of automatically executing the adjustment function. An Adjustment function 0805 indicates a type of adjustment function. In the example in FIG. 8B, the Adjustment function 0805 indicates three functions including monochrome calibration, DFE calibration, and color-transfer adjustment. Details of the functions have already been described in FIG. 3C, and the redundant descriptions are omitted. An automatic colorimetric unit 0806 indicates an automatic colorimetric unit capable of automatically executing the adjustment function 0805.

In the example in FIG. 8B, the monochrome calibration and the DFE calibration can be automatically executed by both of the in-line sensor built into the image forming apparatus 0102 and the automatic adjustment unit 0108, whereas the color-transfer adjustment can be automatically executed by only the automatic adjustment unit 0108. Since The monochrome calibration and the DFE calibration are adjustment functions using the spectroscopic sensors 0107 and 0109 built into the image forming apparatus 0102 and the automatic adjustment unit 0108, respectively, the adjustment functions can be executed by both of the image forming apparatus 0102 and the automatic adjustment unit 0108. On the other hand, since the color-transfer adjustment can be executed using the CIS 0110 built into only the automatic adjustment unit 0108, only the automatic adjustment unit 0108 is associated as the automatic colorimetric unit 0806. The above-described adjustment functions and automatic colorimetric units capable of automatically executing the adjustment functions are merely examples.

Figure 9A:
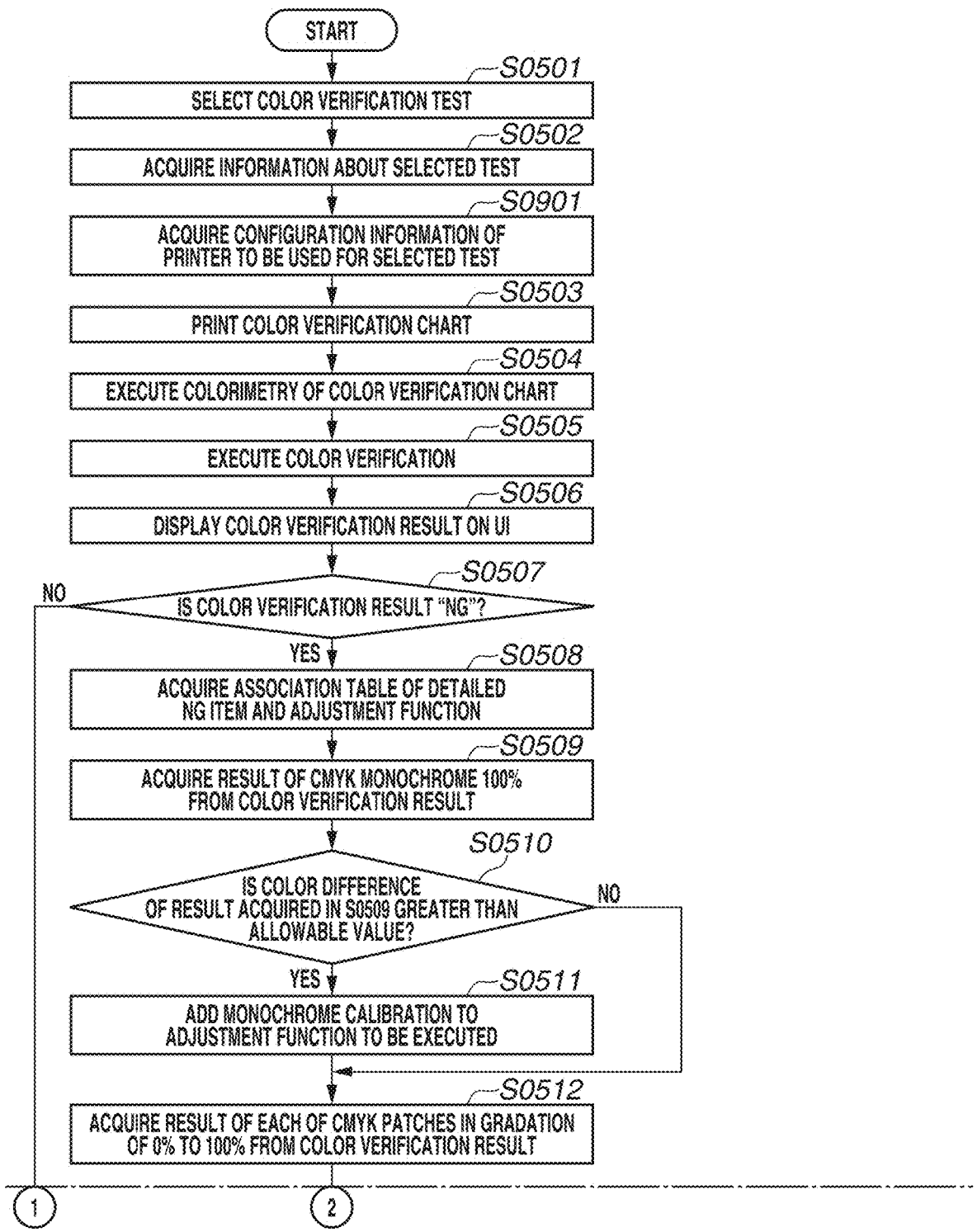
FIGS. 9A and 9B are flowcharts illustrating processing of an adjustment function execution method, according to the second exemplary embodiment, in which an adjustment function is associated with an automatic colorimetric unit and that is executed when a result of a color verification does not satisfy an allowable value.
Figure 9B:
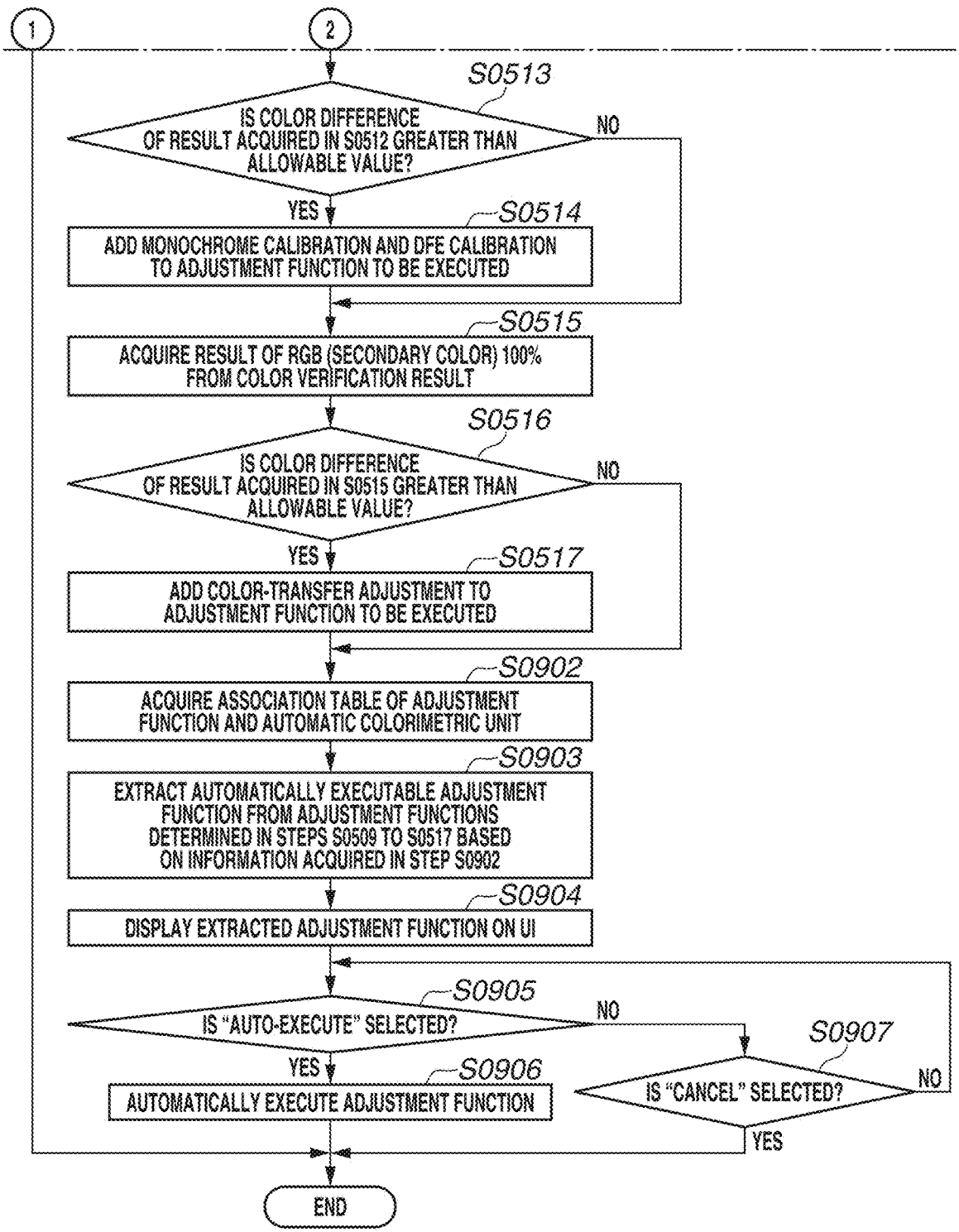

FIGS. 9A and 9B are flowcharts illustrating processing of an adjustment function execution method, in which an adjustment function(s) is associated with an automatic colorimetric unit, which is executed when allowable values are not satisfied in color verification. The below-described processing is executed by the CPU 0201 of the client computer 0101, the CPU 0207 of the image forming apparatus 0102, the CPU 0221 of the automatic adjustment unit 0108, the CPU 0235 of the image processing apparatus 0112, and the CPU 0242 of the database 0117.

The processing in steps S0501 and S0502 is similar to the processing in the first exemplary embodiment in FIG. 5A, and the redundant description are omitted.

In step S0901, based on the information acquired in step S0502, the CPU 0201 of the client computer 0101 acquires configuration information (i.e., information table 0801) of the image forming apparatus 0102 from the database 0117 via the network 0118, and stores the configuration information in the RAM 0202. The processing in steps S0503 to S0517 is similar to the processing in the first exemplary embodiment in FIGS. 5A and 5B, and the redundant descriptions are omitted.

In step S0902, the CPU 0201 of the client computer 0101 acquires the information table 0804, in which an adjustment function is associated with an automatic colorimetric unit, from the database 0117 via the network 0118, and stores the information table 0804 in the RAM 0202. Next, in step S0903, the CPU 0201 of the client computer 0101 extracts (determines) an automatically executable function from the adjustment functions to be executed. Specifically, based on the configuration information (i.e., information table 0801) acquired in step S0902, the adjustment functions extracted in steps S0509 to S0517, and the information table 0804 acquired in step S0902, the CPU 0201 extracts the automatically executable function from the adjustment functions to be executed. Then, in step S0904, the CPU 0201 of the client computer 0101 displays a list of the adjustment functions to be executed, extracted in step S0903, on the display unit 0205. A screen 1001 to be displayed in this processing will be described below with reference to FIG. 10. In step S0905, the CPU 0201 of the client computer 0101 determines whether an AUTO-EXECUTE button 1005 is selected on the screen displayed in step S0904. In a case where the CPU 0201 determines that an AUTO-EXECUTE button 1005 is selected on the screen 1001 displayed in step S0904 (YES in step S0905), the processing proceeds to step S0906. In a case where the CPU 0201 determines that an AUTO-EXECUTE button 1005 is not selected on the screen 1001 displayed in step S0904 (NO in step S0905), the processing proceeds to step S0907.

In step S0906, the CPU 0201 of the client computer 0101 issues an instruction via the network 0118 to cause the image forming apparatus 0102, the automatic adjustment unit 0108, and the image processing apparatus 0112 to execute the adjustment functions to be executed, displayed in step S0904. The CPU 0207 of the image forming apparatus 0102, the CPU 0221 of the automatic adjustment unit 0108, and the CPU 0235 of the image processing apparatus 0112 automatically execute the adjustment functions based on the received instruction on the adjustment functions. After the adjustment functions, the processing is ended. In step S0907, the CPU 0201 of the client computer 0101 determines whether a CANCEL button 1004 is selected on the screen 1001 displayed in step S0904. In a case where the CPU 0201 of the client computer 0101 determines that the CANCEL button 1004 is selected on the screen 1001 displayed in step S0904 (YES in step S0907), the CPU 0201 closes the screen 1001 and ends the processing. In a case where the CPU 0201 determines that the CANCEL button 1004 is not selected on the screen 1001 displayed in step S0904 (NO in step S0907), the processing returns to step S0905.

Figure 10:
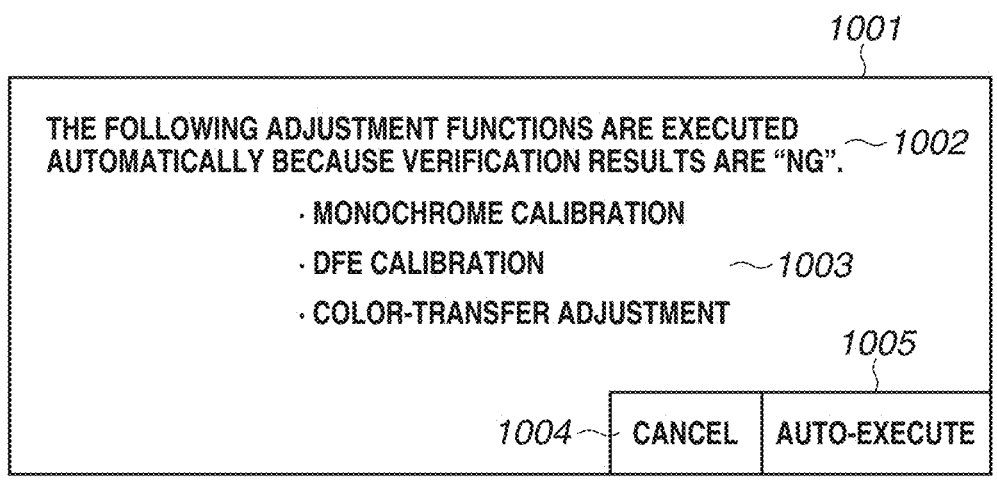
FIG. 10 is a diagram illustrating an example of a screen on which the user checks a verification result acquired by a color verification method according to the second exemplary embodiment.

FIG. 10 is the screen 1001 of a list of automatically executable adjustment functions to be executed in a case where allowable values are not satisfied in color verification. The screen 1001 is superimposed and displayed on the screen 0601 in FIG. 6A. The screen 1001 displays a list of automatically-executable adjustment functions. An item 1002 notifies the user that adjustment functions listed and displayed on the screen 1001 is functions that are to be automatically executed. An item 1003 illustrates the list of adjustment functions to be executed, extracted in steps S0509 to S0517, and steps S0902 to S0903. In a case where the CANCEL button 1004 is pressed, the adjustment functions are not executed, and screen transition is performed to the screen 0601 for the color verification result checking illustrated in FIG. 6A. In a case where an AUTO-EXECUTE button 1005 is pressed, subsequent processing is executed. The CPU 0201 of the client computer 0101 issues an instruction via the network 0118 to cause the image forming apparatus 0102, the automatic adjustment unit 0108, and the image processing apparatus 0112 to automatically execute the adjustment functions displayed in the list.

As described above, the adjustment function is associated with, in addition the details of the item of the color verification result to be checked, the automatic colorimetric unit capable of automatically executing the adjustment function. With this configuration, the adjustment function can be automatically executed by the specified automatic colorimetric unit, based on the above-described association information.

According to the second exemplary embodiment, the adjustment function(s) is associated with, in addition to the details of the item of the color verification result to be checked, the automatic colorimetric unit capable of automatically executing the adjustment function, whereby the adjustment function can be automatically executed by the specified automatic colorimetric unit, based on the above-described association information. Alternatively, the automatic colorimetric unit may be selected by the user instead of being specified by the system.

The processing according to a third exemplary embodiment, in which an adjustment function(s) is associated with an automatic colorimetric unit, which allows a user to select an automatic colorimetric unit to execute the adjustment function(s) in a case where allowable values are not satisfied in color verification, will be described with reference to FIGS. 11A, 11B and 12.

Figure 11A:
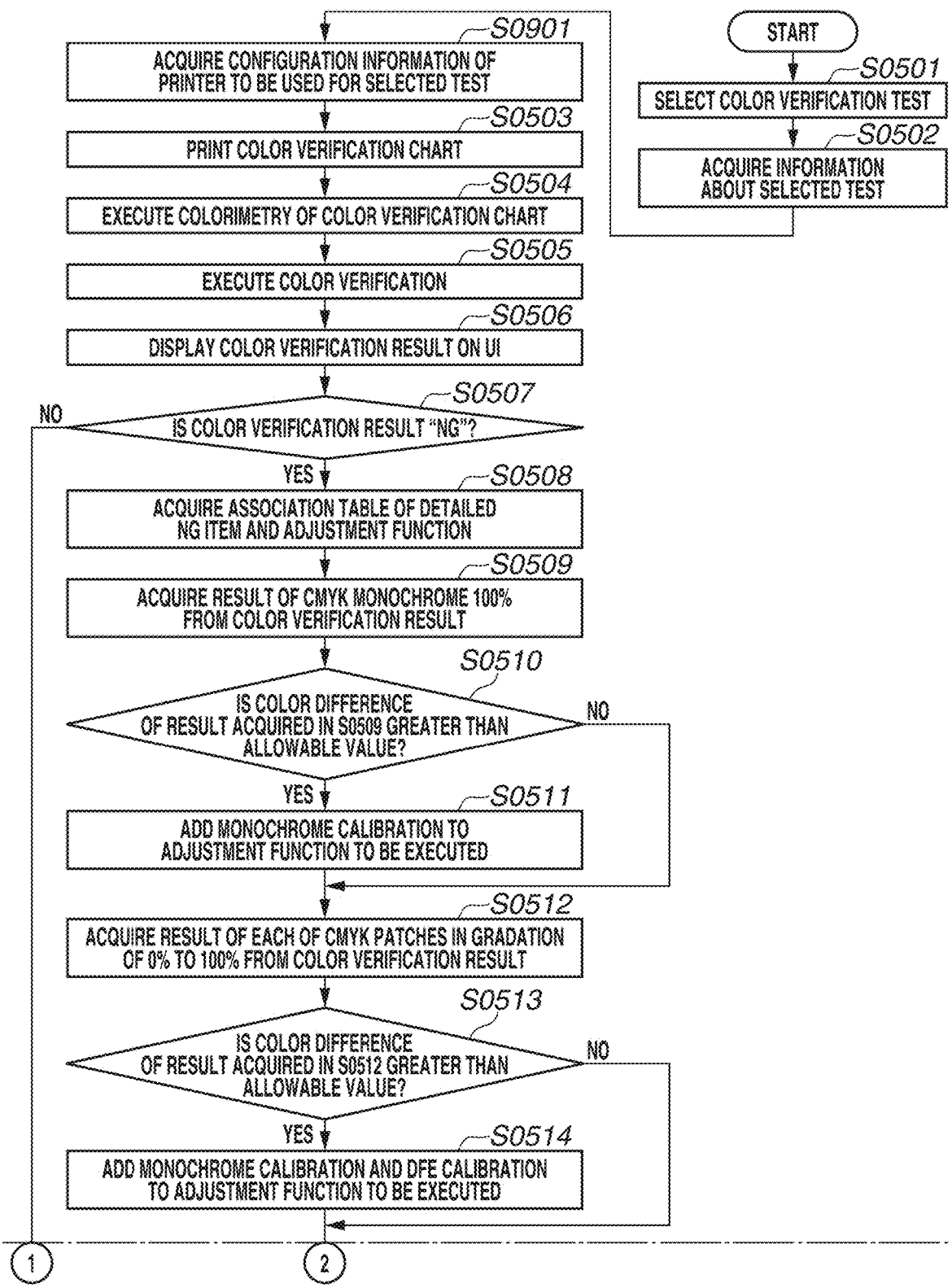
FIGS. 11A and 11B are flowcharts illustrating processing, according to a third exemplary embodiment, in which an adjustment function is associated with an automatic colorimetric unit and in which a user selects an automatic colorimetric unit to execute the adjustment function, when a result of a color verification does not satisfy an allowable value.
Figure 11B:
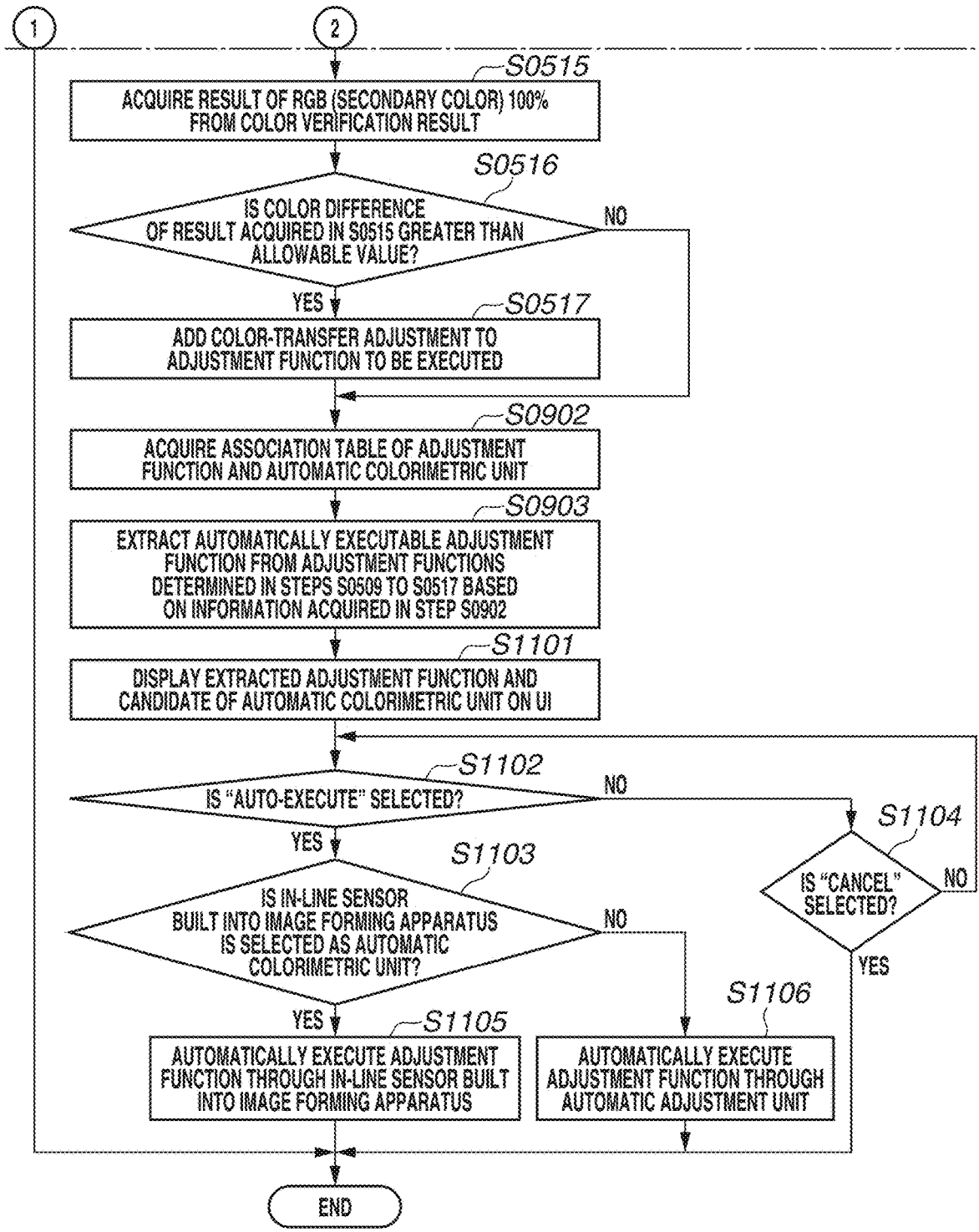

FIGS. 11A and 11B are a flowchart illustrating the processing according to the present exemplary embodiment, in which an adjustment function is associated with an automatic colorimetric unit, which allows a user to select an automatic colorimetric unit to execute the adjustment function in a case where allowable values are not satisfied in color verification. The below-described processing is executed by the CPU 0201 of the client computer 0101, the CPU 0207 of the image forming apparatus 0102, the CPU 0221 of the automatic adjustment unit 0108, the CPU 0235 of the image processing apparatus 0112, and the CPU 0242 of the database 0117.

The pieces of processing in steps S0501 to S0517 and steps S0901 to S0903 are similar to those in the first exemplary embodiment in FIGS. 5A and 5B and the second exemplary embodiment in FIGS. 9A and 9B, and the redundant descriptions are omitted. In step S1101, based on the list of adjustment functions to be executed extracted in step S0903 and the information acquired in step S0902, the CPU 0201 of the client computer 0101 displays the automatic colorimetric unit capable of automatically executing the adjustment functions on the display unit 0205. A screen 1201 displayed in this processing will be described below with reference to FIG. 12. In step S1102, the CPU 0201 of the client computer 0101 determines whether an AUTO-EXECUTE button 1207 is selected on the screen 1201 displayed in step S1101. In a case where the CPU 0201 determines that the AUTO-EXECUTE button 1207 is selected on the screen 1201 displayed in step S1101 (YES in step S1102), the processing proceeds to step S1103. In a case where the CPU 0201 determines that the AUTO-EXECUTE button 1207 is not selected on the screen 1201 displayed in step S1101 (NO in step S1102), the processing proceeds to step S1104.

In step S1103, the CPU 0201 of the client computer 0101 determines whether the in-line sensor built into the image forming apparatus 0102 is selected as the automatic colorimetric unit on the screen 1201 displayed in step S1101. In a case where the CPU 0201 determines that the in-line sensor built into the image forming apparatus 0102 is selected as the automatic colorimetric unit in step S1101 (YES in step S1103), the processing proceeds to step S1105. In a case where the CPU 0201 determines that the in-line sensor built into the image forming apparatus 0102 is not selected as the automatic colorimetric unit on the screen 1201 displayed in step S1101 (NO in step S1103), the processing proceeds to step S1106.

In step S1104, the CPU 0201 of the client computer 0101 determines whether a CANCEL button 1206 is selected on the screen 1201 displayed in step S1101. In a case where the CPU 0201 of the client computer 0101 determines that the CANCEL button 1206 is selected on the screen 1201 displayed in step S1101 (YES in step S1104), the CPU 0201 closes the screen 1201 and ends the processing. In a case where the CPU 0201 determines that the CANCEL button 1206 is not selected on the screen 1201 displayed in step S1101 (NO in step S1104), the processing returns to step S1102.

In step S1105, the CPU 0201 of the client computer 0101 issues an instruction to cause the image forming apparatus 0102 and the image processing apparatus 0112 to use the in-line sensor built into the image forming apparatus 0102 to execute the adjustment functions to be executed, displayed in step S1101. Based on the received instruction on the adjustment functions, the CPU 0207 of the image forming apparatus 0102 and the CPU 0235 of the image processing apparatus 0112 automatically execute the adjustment functions by using the in-line sensor built into the image forming apparatus 0102. Then, the processing is ended.

In step S1106, the CPU 0201 of the client computer 0101 issues an instruction to the image forming apparatus 0102, the automatic adjustment unit 0108, and the image processing apparatus 0112 to cause the automatic adjustment unit 0108 to execute the adjustment functions to be executed, displayed in step S1101. Based on the received instruction on the adjustment functions, the CPU 0207 of the image forming apparatus 0102, the CPU 0221 of the automatic adjustment unit 0108, and the CPU 0235 of the image processing apparatus 0112 automatically execute the adjustment functions at the automatic adjustment unit 0108. Then, the processing is ended.

Figure 12:
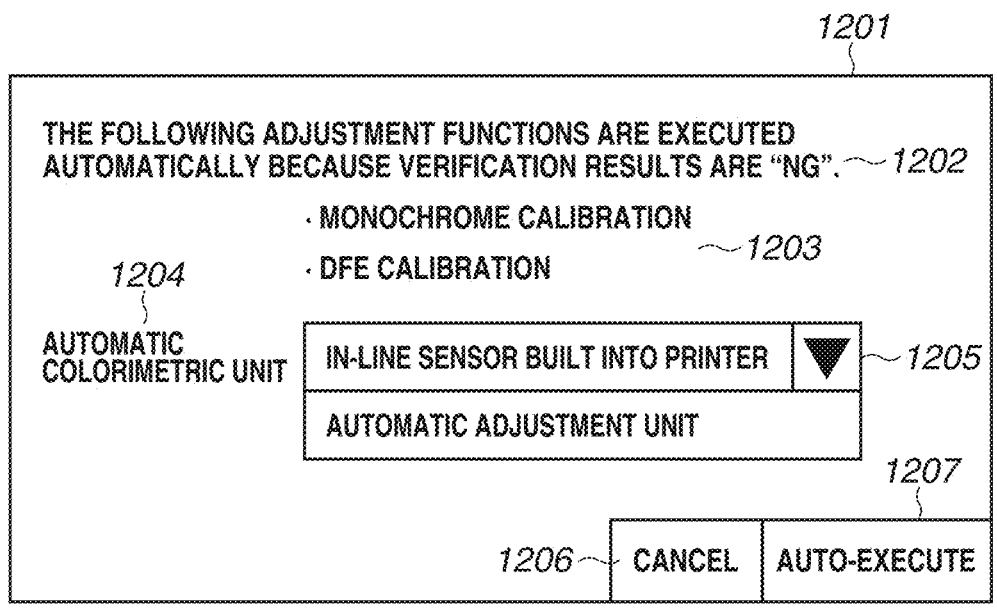
FIG. 12 is a diagram illustrating an example of a screen on which the user checks a verification result acquired by a color verification method according to the third exemplary embodiment.

FIG. 12 illustrates the screen 1201 of the list of automatically executable adjustment functions that are to be executed in a case where the allowable values are not satisfied in color verification. The screen 1201 is superimposed and displayed on the screen 0601 in FIG. 6A. The screen 1201 displays a list of automatically executable adjustment functions, and the user selects an automatic colorimetry unit from the screen 1201. An item 1202 notifies that the adjustment functions listed and displayed on the screen 1201 are functions that are to be automatically executed. An item 1203 is the list of adjustment functions to be executed, extracted in steps S0509 to S0517, and steps S0902 to S0903. An item 1204 indicates a selection item of an automatic colorimetric unit for execution of the adjustment functions. A drop-down item 1205 indicates selectable automatic colorimetric units. The user selects an automatic colorimetric unit for execution of the adjustment function from a list displayed in the drop-down item 1205. The above-described drop-down listing method is merely an example. In a case where the CANCEL button 1206 is pressed, the adjustment functions are not executed, and screen transition is performed to the screen 0601 for the color verification result checking illustrated in FIG. 6A. In a case where an AUTO-EXECUTE button 1207 is pressed, subsequent processing is executed. The CPU 0201 of the client computer 0101 instructs the image forming apparatus 0102, the automatic adjustment unit 0108, and the image processing apparatus 0112 via the network 0118 to automatically execute the adjustment functions displayed in the list at the automatic colorimetric unit selected by the user.

As described above, by allowing the user to select the automatic colorimetric unit, the adjustment function(s) can automatically be executed based on the determination made by the user.

In the first, the second, and the third exemplary embodiments, in a case where a color verification result does not satisfy the allowable values when color verification is executed, a color difference of each of color patches used for the color verification is checked, and a previously defined adjustment function(s) based on a checking result is executed.

However, there is a possibility that the color verification result does not satisfy the allowable values even when the color verification is executed again after execution of the adjustment function(s) of the image forming apparatus. In this case, use of an improper color profile in color conversion of print data may be considered as a cause of the above-described issue. If a color profile used in the color verification has been created based on color patches printed on a sheet different from a sheet for the color verification, there is a possibility that the color verification result does not satisfy the allowable values.

In this case, a color profile created based on color patches printed on a proper sheet is used.

Therefore, in a case where a color verification result does not satisfy the allowable values even when the color verification is executed again after execution of the adjustment function(s) of the image forming apparatus, a function for creating a color profile may be executed instead of executing the adjustment function(s) again.

Processing of a color profile creation function execution method according to the present exemplary embodiment, which is executed when allowable values are not satisfied in second color verification after execution of an adjustment function(s), will be described with reference to FIGS. 13 and 14.

Figure 13:
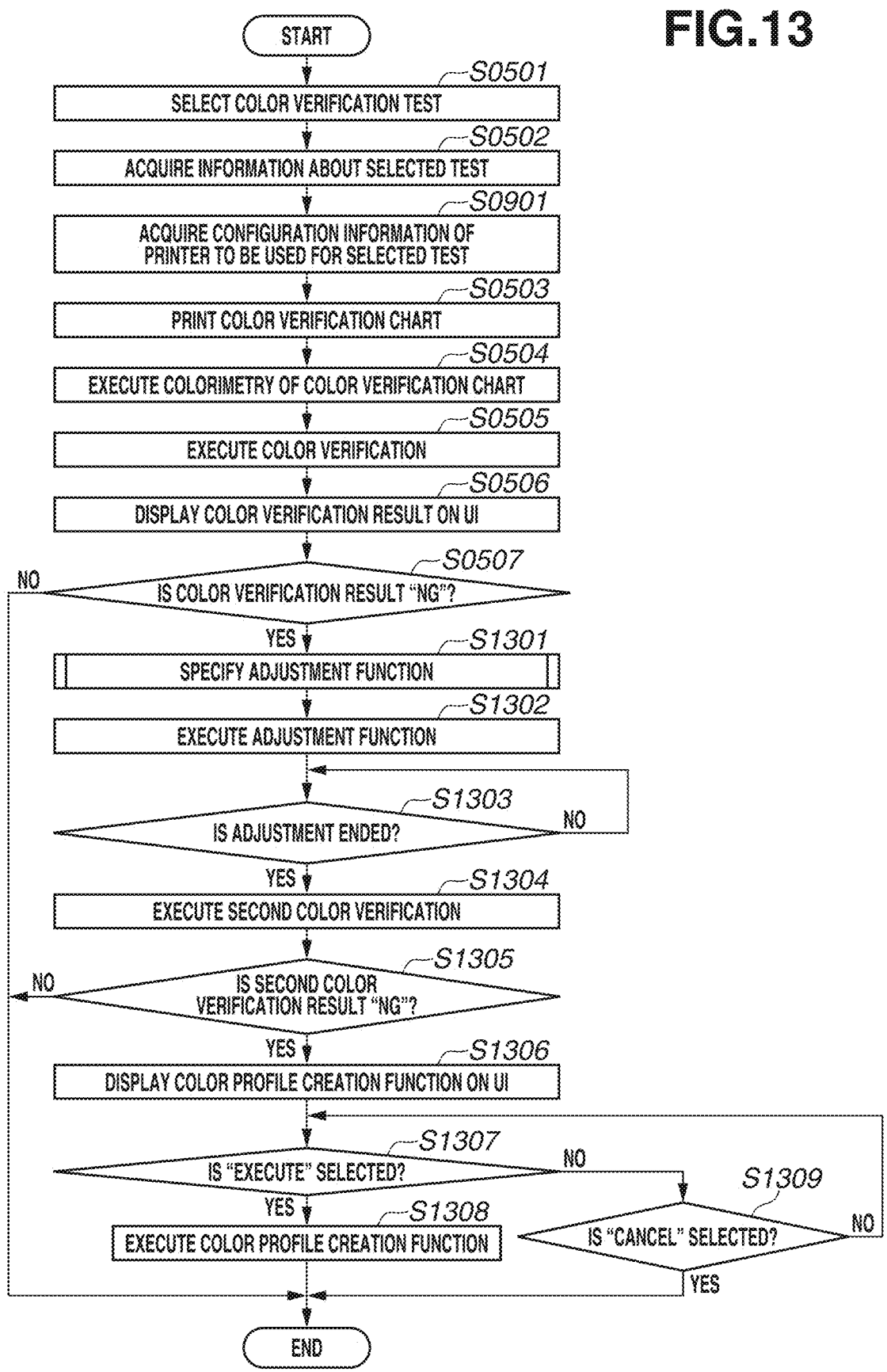
FIG. 13 is a flowchart illustrating processing of a color profile creation function execution method, according to a fourth exemplary embodiment, that is executed when a result of a second color verification does not satisfy an allowable value after execution of an adjustment function.
Figure 14:
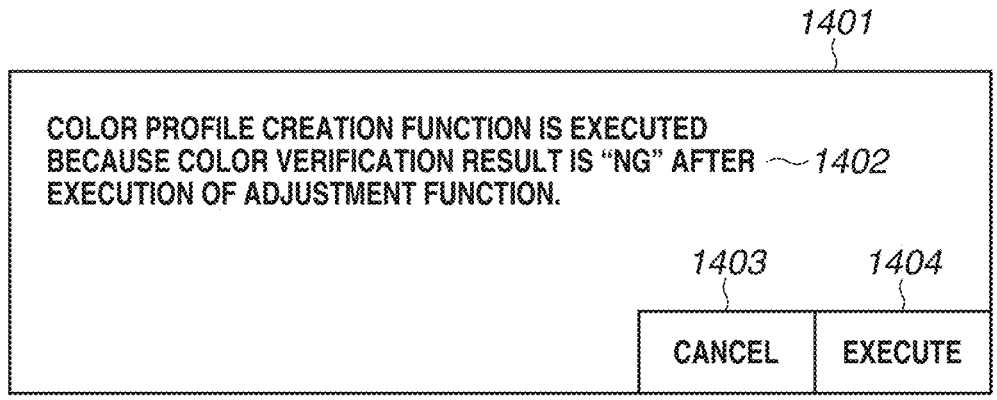
FIG. 14 is a diagram illustrating an example of a screen on which the user checks a verification result acquired by a color verification method according to the fourth exemplary embodiment.

FIG. 13 is a flowchart illustrating processing of a color profile creation function execution method according to the present exemplary embodiment, which is executed when allowable values are not satisfied in second color verification after execution of the adjustment function(s). The below-described processing is executed by the CPU 0201 of the client computer 0101, the CPU 0207 of the image forming apparatus 0102, the CPU 0221 of the automatic adjustment unit 0108, the CPU 0235 of the image processing apparatus 0112, and the CPU 0242 of the database 0117.

The pieces of processing in steps S0501 to S0507 and step S0901 are similar to the processing in the first exemplary embodiment in FIG. 5A and the second exemplary embodiment in FIGS. 9A and 9B, and the redundant descriptions are omitted. The pieces of processing in steps S0508 to S0518, steps S0902 and S0904, and step S1101, described in the flowcharts of the first exemplary embodiment in FIGS. 5A and 5B, the second exemplary embodiment in FIGS. 9A and 9B, and the third exemplary embodiment in FIGS. 11A and 11B, respectively, are collectively executed in step S1301. In step S1302, the CPU 0201 of the client computer 0101 issues instructions via the network 0118 to cause the image forming apparatus 0102 to execute the adjustment function(s) specified in step S1301.

In step S1303, the CPU 0201 of the client computer 0101 checks via the network 0118 whether the image forming apparatus 0102 has completed execution of the adjustment function(s), and determines whether the adjustment function(s) is ended. In a case where the CPU 0201 determines that the adjustment function(s) is ended (YES in step S1303), the processing proceeds to step S1304. In a case where the CPU 0201 determines that the adjustment function(s) is not ended (NO in step S1303), the CPU 0201 continuously checks whether the adjustment function(s) is ended.

In step S1304, the CPU 0201 of the client computer 0101 executes the processing similar to the processing in steps S0501 to S0506 and step S0901 to execute the second color verification based on the same reference. In step S1305, the CPU 0201 of the client computer 0101 executes the processing similar to the processing in step S0507 and determines whether a second color verification result based on the same reference satisfies the allowable values. In a case where the CPU 0201 determines that the second color verification result based on the same reference satisfies the allowable value(s), which means that the second color verification result is not NG (NO in step S1305), the processing is ended. In a case where the CPU 0201 determines that the second color verification result based on the same reference does not satisfy the allowable value(s), which means that the second color verification result is NG, (YES in step S1305), the processing proceeds to step S1306.

In step S1306, the CPU 0201 of the client computer 0101 displays a screen 1401 for executing the color profile creation function on the display unit 0205. The screen 1401 displayed in the processing will be described below with reference to FIG. 14. In step S1307, the CPU 0201 of the client computer 0101 determines whether an EXECUTE button 1404 is selected from the screen 1401 displayed in step S1306. In a case where the CPU 0201 determines that the EXECUTE button 1404 is selected on the screen 1401 displayed in step S1306 (YES in step S1307), the processing proceeds to step S1308. In a case where the CPU 0201 determines that the EXECUTE button 1404 is not selected on the screen 1401 displayed in step S1306 (NO in step S1307), the processing proceeds to step S1309.

In step S1308, the CPU 0201 of the client computer 0101 executes the color profile creation function. In the color profile creation function, color patches to be used for creating the color profile are printed on a sheet of a size and a type which are the same as a size and a type specified in the print setting of color verification stored in step S0503, and colorimetry of the color patches is executed. Based on signal values of CMYK of the color patches and Lab values acquired by the colorimetry, a conversion relationship between a Lab value and a CMYK signal value to specify what Lab value is converted to which CMYK signal value is derived from the correspondence relationship between the signal values and the Lab values, and a color profile is created based on the conversion relationship. A proper color profile according to the print setting of color verification stored in step S0503, i.e., a color profile different from the color profile used when a color verification result does not satisfy the allowable values, is newly created through the execution of the color profile creation function. By executing color verification using the color profile newly created by the above-described function, the allowable values can be satisfied. For example, allowable values will not be satisfied if "General Profile" created for standard paper is used in color verification of "Company's Own Reference" in which coated paper is set as a print setting. In this case, the color profile creation function is executed. By the color profile creation function, a color profile of "Company's Own Profile" is created for the color verification using coated paper. By using the color profile "Company's Own Profile" in the color verification of "Company's Own Reference" in which the coated paper is set as a print setting, printing is executed with a proper color setting, and the color verification result can satisfy the allowable values.

In step S1309, the CPU 0201 of the client computer 0101 determines whether a CANCEL button 1403 is selected on the screen displayed in step S1306. In a case where the CPU 0201 of the client computer 0101 determines that the CANCEL button 1403 is selected on the screen displayed in step S1306 (YES in step S1309), the CPU 0201 closes the screen 1401 and ends the processing. In a case where the CPU 0201 determines that the CANCEL button 1403 is not selected on the screen 1401 displayed in step S1306 (NO in step S1309), the processing returns to step S1307.

As described above, in a case where the allowable values is not satisfied even when color verification is executed again after execution of the adjustment functions, color profile creation function is executed, which improves the color quality.

According to the above-described exemplary embodiments, an adjustment function to be executed by the image forming apparatus can be specified based on a verification result of color quality, which eliminates the need for knowledge of users about an adjustment function to be executed based on a color verification result.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors, circuitry, or combinations thereof (e.g., central processing unit (CPU), micro processing unit (MPU), or the like), and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, or the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2022-042911, filed Mar. 17, 2022, which is hereby incorporated by reference herein in its entirety.

What is claimed is:

1. A system comprising:
   at least one processor configured to function as:
   a color verification unit configured to execute color verification by using a colorimetric value acquired by colorimetry of a sheet output by an image forming apparatus;
   a determination unit configured to determine an adjustment function to be executed by the image forming apparatus or an image processing apparatus connected to the image forming apparatus from among a plurality of adjustment functions, based on a result of the color verification, wherein the plurality of adjustment functions includes a first adjustment function for correcting gradation of a color and a second function for adjusting a transfer condition of toner; and
   a display unit configured to display the determined adjustment function to be executed wherein a display indicating the first adjustment function is based on a first result of the color verification and a display indicating the second adjustment function is based on a second result of the color verification.

2. The system according to claim 1, wherein the at least one processor is further configured to function as an execution unit configured to execute the adjustment function determined by the determination unit at the image forming apparatus or the image processing apparatus connected to the image forming apparatus.

3. The system according to claim 2, wherein the execution unit executes an adjustment function determined by the determination unit from among the plurality of adjustment functions, and does not execute an adjustment function not determined by the determination unit.

4. The system according to claim 1, wherein the at least one processor is further configured to function as:

a plurality of automatic adjustment units configured to be used for execution of an adjustment function, wherein, based on a result of the color verification, the determination unit further determines an automatic adjustment unit to be used for execution of an adjustment function from among the plurality of automatic adjustment units.

5. The system according to claim 1, wherein the plurality of adjustment functions includes at least any one of monochrome calibration, digital front-end (DFE) calibration, and color-transfer adjustment.

6. The system according to claim 5, wherein the monochrome calibration and the color-transfer adjustment are adjustment functions of the image forming apparatus, and the DFE calibration is an adjustment function of the image processing apparatus.

7. An information processing apparatus comprising:
at least one processor configured to function as:
a color verification unit configured to execute color verification by using a colorimetric value acquired by colorimetry of a sheet output by an image forming apparatus;
a determination unit configured to determine an adjustment function to be executed by the image forming apparatus or an image processing apparatus connected to the image forming apparatus from among a plurality of adjustment functions, based on a result of the color verification, wherein the plurality of adjustment functions includes a first adjustment function for correcting gradation of a color and a second function for adjusting a transfer condition of toner; and
a display unit configured to display the determined adjustment function to be executed wherein a display indicating the first adjustment function is based on a first result of the color verification and a display indicating the second adjustment function is based on a second result of the color verification.

8. The information processing apparatus according to claim 7, wherein the at least one processor is further configured to function as a transmission unit configured to transmit an instruction to cause the image forming apparatus or an image processing apparatus connected to the image forming apparatus to execute the adjustment function determined by the determination unit.

9. The information processing apparatus according to claim 7, wherein the at least one processor is further configured to function as:
a plurality of automatic adjustment units configured to be used for execution of an adjustment function,
wherein, based on a result of the color verification, the determination unit further determines an automatic adjustment unit to be used for execution of an adjustment function from among the plurality of automatic adjustment units.

10. A control method of an information processing apparatus comprising:
executing color verification by using a colorimetric value acquired by colorimetry of a sheet output by an image forming apparatus;
determining an adjustment function to be executed by the image forming apparatus or an image processing apparatus connected to the image forming apparatus from among a plurality of adjustment functions, based on a result of the color verification, wherein the plurality of adjustment functions includes a first adjustment function for correcting gradation of a color and a second function for adjusting a transfer condition of toner; and
displaying the determined adjustment function to be executed wherein a display indicating the first adjustment function is based on a first result of the color verification and a display indicating the second adjustment function is based on a second result of the color verification.

11. The control method of an information processing apparatus according to claim 10, further comprising transmitting an instruction to cause the image forming apparatus or an image processing apparatus connected to the image forming apparatus to execute the adjustment function determined by the determining.

12. A non-transitory computer-readable storage medium storing a computer-readable program for causing a computer to function as an information processing apparatus comprising at least one processor configured to function as:
a color verification unit configured to execute color verification by using a colorimetric value acquired by colorimetry of a sheet output by an image forming apparatus;
a determination unit configured to determine an adjustment function to be executed by the image forming apparatus or an image processing apparatus connected to the image forming apparatus from among a plurality of adjustment functions, based on a result of the color verification, wherein the plurality of adjustment functions includes a first adjustment function for correcting gradation of a color and a second function for adjusting a transfer condition of toner; and
a display unit configured to display the determined adjustment function to be executed wherein a display indicating the first adjustment function is based on a first result of the color verification and a display indicating the second adjustment function is based on a second result of the color verification.

13. The system according to claim 1, wherein the plurality of adjustment functions further includes a color profile creation function for creating a color profile.

14. The system according to claim 1, wherein in a case where the second result of the color verification is not satisfied, a color profile creation function for creating a color profile is determined to be as the adjustment function to be executed.

15. The system according to claim 1, wherein the at least one processor further functions as a storage unit configured to store a result of the color verification in association with an adjustment function.

16. The system according to claim 15, wherein the storage unit further stores information whether an automatic adjustment unit is present in association with each image forming apparatus.

17. The system according to claim 15, wherein the at least one processor further functions as a prompt unit configured to prompt a user to determine whether to execute the displayed adjustment function.

* * * * *